(12) United States Patent
Sheeder et al.

(10) Patent No.: US 11,881,322 B2
(45) Date of Patent: Jan. 23, 2024

(54) JOINING AND SEALING PRESSURIZED CERAMIC STRUCTURES

(71) Applicant: General Atomics, San Diego, CA (US)

(72) Inventors: Jonathan David Sheeder, San Diego, CA (US); Jiping Zhang, San Diego, CA (US); Christian Peter Deck, San Diego, CA (US); Hesham Ezzat Khalifa, San Diego, CA (US); Robert Warren Stemke, San Diego, CA (US); Brian Stephen Austin, Ramona, CA (US); Gokul Vasudevamurthy, San Diego, CA (US); Carlos Bacalski, San Diego, CA (US); Eric Song, Yorba Linda, CA (US); Christina Allyssa Back, San Diego, CA (US)

(73) Assignee: General Atomics, San Diego, CA (US)

( * ) Notice: Subject to any disclaimer, the term of this patent is extended or adjusted under 35 U.S.C. 154(b) by 0 days.

(21) Appl. No.: 17/153,855

(22) Filed: Jan. 20, 2021

(65) Prior Publication Data
US 2021/0166825 A1 Jun. 3, 2021

Related U.S. Application Data

(63) Continuation of application No. PCT/US2018/055704, filed on Oct. 12, 2018.
(Continued)

(51) Int. Cl.
*G21C 3/07* (2006.01)
*G21C 3/10* (2006.01)
(Continued)

(52) U.S. Cl.
CPC .............. *G21C 3/07* (2013.01); *C04B 37/005* (2013.01); *C04B 37/008* (2013.01); *G21C 3/10* (2013.01);
(Continued)

(58) Field of Classification Search
CPC . C04B 35/571; C04B 35/6269; C04B 37/008; C04B 2237/50; C04B 2237/525;
(Continued)

(56) References Cited

U.S. PATENT DOCUMENTS 5,282,734 A 2/1994 Pastureau et al.
5,364,660 A 11/1994 Gabor et al.
(Continued)

FOREIGN PATENT DOCUMENTS

CN 105706176 A 6/2016
CN 105960681 A 9/2016
(Continued)

OTHER PUBLICATIONS

Khalifa, H.E. et al., "Fabrication and characterization of joined silicon carbide cylindrical components for nuclear applications," Journal of Nuclear Materials, 457:227-240, 2015 (14 pages).
(Continued)

*Primary Examiner* — Alex B Efta

(57) ABSTRACT

This patent document relates to systems, structures, devices, and fabrication processes for ceramic matrix composites suitable for use in a nuclear reactor environment and other applications requiring materials that can withstand high temperatures and/or highly corrosive environments. In one exemplary aspect, a method of joining and sealing ceramic structures is disclosed. The method comprises forming a joint of a ceramic structure and an end plug using a sealing material, wherein the end plug has a hole that goes through a top surface and a bottom surface of the end plug; filling the ceramic structure with a desired gas composition through the hole; heating a material into a molten form using a heat source; and directing the material into the hole, wherein the material solidifies to seal the end plug.

24 Claims, 35 Drawing Sheets

Related U.S. Application Data

(60) Provisional application No. 62/574,721, filed on Oct. 19, 2017.

(51) Int. Cl.
*G21C 21/02* (2006.01)
*C04B 37/00* (2006.01)

(52) U.S. Cl.
CPC ............ *G21C 3/105* (2013.01); *G21C 21/02* (2013.01); *C04B 2237/50* (2013.01); *C04B 2237/525* (2013.01); *C04B 2237/59* (2013.01); *C04B 2237/765* (2013.01); *C04B 2237/84* (2013.01)

(58) Field of Classification Search
CPC . C04B 2237/59; C04B 2237/765; G21C 3/10; G21C 3/07; G21C 21/02
See application file for complete search history.

(56) References Cited

U.S. PATENT DOCUMENTS

| | | | |
|---|---|---|---|
| 5,374,800 | A | 12/1994 | Yoneda |
| 5,997,293 | A | 12/1999 | Grunenfelder et al. |
| 9,132,619 | B2 | 9/2015 | Khalifa et al. |
| 10,801,753 | B2 * | 10/2020 | Kuckelkorn ......... B23K 26/206 |
| 2004/0089237 | A1 | 5/2004 | Pruett et al. |
| 2010/0190030 | A1 | 7/2010 | Ramsayer et al. |
| 2011/0073236 | A1 | 3/2011 | Lee |
| 2013/0266363 | A1 * | 10/2013 | Khalifa ............... C04B 35/6267 403/270 |
| 2015/0078505 | A1 | 3/2015 | Xu et al. |
| 2017/0330638 | A1 | 11/2017 | Ishibashi et al. |
| 2020/0118696 | A1 * | 4/2020 | Pomirleanu ............. G21C 3/10 |

FOREIGN PATENT DOCUMENTS

| | | | |
|---|---|---|---|
| EP | 2647611 | A1 | 10/2013 |
| JP | S62-71598 | U | 5/1987 |
| JP | S62-187180 | A | 8/1987 |
| JP | H04-505054 | A | 9/1992 |
| JP | H06-22235 | U | 6/1994 |
| JP | H06-160589 | A | 6/1994 |
| JP | H08-129090 | A | 5/1996 |
| JP | 2012-233734 | A | 11/2012 |
| JP | 2016-155751 | A | 9/2016 |
| JP | 2016-531080 | A | 10/2016 |
| JP | 2017-515094 | A | 6/2017 |
| KR | 1020030085878 | A | 11/2003 |
| KR | 10-0819797 | B | 4/2008 |
| KR | 1020110057366 | A | 6/2011 |
| KR | 10-2016-0132933 | A | 11/2016 |
| RU | 2673 | U1 | 8/1996 |
| WO | 9013898 | | 11/1990 |
| WO | 2015038286 | A1 | 3/2015 |
| WO | 2015175034 | A2 | 11/2015 |
| WO | 2016084146 | A1 | 6/2016 |

OTHER PUBLICATIONS

Supplementary Partial European Search Report for European Patent Application No. 18874066.6, dated Jun. 24, 2021 (18 pages).
Extended European Search Report for European Patent Application No. 18874066.6, dated Sep. 24, 2021 (16 pages).
Office Action for Russian Patent Application No. 2020116210, dated Apr. 8, 2021 (17 pages).
Decision of Grant for Russian Patent Application No. 2020116210, dated Sep. 8, 2021 (31 pages).
Office Action for Japanese Patent Application No. 2020-522020, dated Nov. 2, 2021 (20 pages).
Examiner's Report for Canadian Patent Application No. 3,079,547, dated Oct. 22, 2021 (5 pages).
First Examination Report for Indian Patent Application No. 202017019185, dated Dec. 24, 2021 (6 pages).
International Application No. PCT/US2018/055704, International Search Report and Written Opinion dated May 29, 2019, pp. 1-20.
International Application No. PCT/US2018/055704, International Preliminary Report on Patentability dated Apr. 30, 2020, pp. 1-17.
Office Action for Japanese Patent Application No. 2020-522020, dated May 31, 2022 (13 pages).
Examiner's Requisition for Canadian Patent Application No. 3,079,547, dated Aug. 29, 2022 (5 pages).
Office Action for Japanese Patent Application No. 2020-522020, dated Feb. 21, 2023 (5 pages).
Office Action for Chinese Patent Application No. 201880079503.9, dated Feb. 3, 2023 (17 pages).
Office Action for Korean Patent Application No. 10-2020-7013774, dated Mar. 15, 2023 (13 pages).
Office Action for Japanese Patent Application No. 2022-015153, dated Apr. 11, 2023 (11 pages).

* cited by examiner

JOINING AND SEALING PRESSURIZED CERAMIC STRUCTURES

PRIORITY CLAIM AND RELATED PATENT APPLICATIONS

This patent document is a continuation of and claims priority to International Application No. PCT/US18/55704, titled "JOINING AND SEALING PRESSURIZED CERAMIC STRUCTURES", filed Oct. 12, 2018, which claims priority to and benefits of U.S. Provisional Patent Application No. 62/574,721 filed on Oct. 19, 2017 with the same title. The International Application No. PCT/US18/55704 was published as PCT Publication No. WO/2019/089212 on May 9, 2019 and is incorporated by reference in its entirety as part of the specification of this patent document.

TECHNICAL FIELD

This patent document relates to systems, structures, devices, and fabrication processes in connection with casing, housing or cladding structures for holding nuclear fuel materials for use in nuclear reactors, or in connection with heat exchangers, or nosecones or nozzles, or with flow channel inserts.

BACKGROUND

Many nuclear reactors use a fissile material as the fuel for nuclear reactions to generate power. The fuel is usually held in robust containers, such as fuel rods, that can endure high operating temperatures of nuclear reactions and maintain the structural integrity in an intense neutron radiation environment. It is desirable that fuel structures maintain their shape and structural integrity over a sufficient period (e.g., several years) within the reactor core, thereby preventing the leakage of fission products into the reactor coolant. Other structures, such as heat exchangers, nozzles, nosecones, flow channel inserts, or related components, also require high temperature performance, corrosion resistance, and specific, non-planar geometries where high dimensional accuracy is important.

SUMMARY

This patent document relates to systems, structures, devices, and fabrication processes for ceramic matrix composites suitable for use in a nuclear reactor environment and other applications requiring materials that can withstand high temperatures and/or highly corrosive environments.

In one exemplary aspect, a method of joining and sealing ceramic structures is disclosed. The method includes forming a joint of a ceramic structure including a tubular structure and an end plug located inside the tubular structure using a sealing material, wherein the end plug is structured to include a hole that goes through a top surface and a bottom surface of the end plug; filling the ceramic structure with a desired gas composition through the hole; heating a material into a molten form using a heat source; and directing the material into the hole, wherein the material solidifies to seal the end plug.

In some embodiments, the forming of the joint includes: applying the sealing material between the ceramic structure and the end plug, wherein the sealing material includes a preceramic polymer and a plurality of inclusions; forming a solid ceramic from the sealing material; and crystallizing the solid ceramic to form a crystalline matrix comprising a same ceramic polymorph as the ceramic structure and the end plug, the plurality of inclusions being disposed within the crystalline matrix.

In some embodiments, the inclusions can include spheres, flakes, whiskers, fibers, or irregular shapes comprising the ceramic polymorph. In some implementations, the sealing material can be cured at a first temperature and pyrolized at a second temperature higher than the first temperature to form the solid ceramic, and the solid ceramic is crystallized at a third temperature higher than the second temperature.

In some embodiments, the method can be implemented to include creating a low pressure in the ceramic structure; and strengthening the joint under the low pressure, before the filling of the desired gas composition, by applying to the crystalline matrix a substantially gas impermeable sealing layer, the substantially gas impermeable sealing layer comprising the same ceramic polymorph as the ceramic structure and the end plug. The strengthening the joint can be performed using chemical vapor infiltration (CVI). In some implementations, the low pressure can be created by removing a substantial amount of gas from the ceramic structure. The crystalline matrix may further include cracks, pores, or voids, and the substantially gas impermeable sealing layer may penetrate partially or fully into the crystalline matrix via the cracks, pores, or voids.

In some embodiments, the desired gas composition includes helium gas. In some implementations, the melted material may have a high melt-temperature. For example, the melted material includes oxide, silicon, or a transition metal.

In some embodiments, the method includes creating a low pressure in the tubal structure; and strengthening the joint under the low pressure before the filling of the desired gas composition. In some embodiments, the method also includes applying the sealing material to an outer surface of the end plug; and strengthening the end plug under a second low pressure. The strengthening can be performed using chemical vapor deposition (CVD). In some implementations, the material in the molten form solidifies while flowing in the hole. In some implementations, the material in the molten form solidifies after the heat source is removed. In some embodiments, the method further includes heat treating the joined ceramic structure and the end plug at a temperature of at least 1350° C.

In another exemplary aspect, a method of joining and sealing ceramic structures is disclosed. The method includes forming a joint of a ceramic structure and an end plug using a sealing material, wherein the end plug has a body including a hole that goes through a top surface and a bottom surface of the end plug, and a pin positioned in the hole; placing a material in the hole of the end plug; applying heat to a section of the ceramic structure near the end plug to heat the material; and applying pressure to the body or the pin so that the pin presses the heated material in the hole to seal the end plug.

In some embodiments, the method also includes applying the sealing material between the ceramic structure and the end plug, wherein the sealing material includes a preceramic polymer and a plurality of inclusions; forming a solid ceramic from the sealing material; and crystallizing the solid ceramic to form a crystalline matrix comprising a same ceramic polymorph as the ceramic structure and the end plug, the plurality of inclusions being disposed within the crystalline matrix.

In some embodiments, the inclusions include spheres, flakes, whiskers, fibers, or irregular shapes comprising the ceramic polymorph. In some implementations, the sealing material is cured at a first temperature and pyrolized at a second temperature higher than the first temperature to form the solid ceramic, and the solid ceramic is crystallized at a third temperature higher than the second temperature.

In some embodiments, the method also includes strengthening the joint under the low pressure by forming a substantially gas impermeable sealing layer on the crystalline matrix, the substantially gas impermeable sealing layer comprising the same ceramic polymorph as the ceramic structure and the end plug. The strengthening the joint may be performed using chemical vapor infiltration (CVI). The crystalline matrix may further include cracks, pores, or voids, and the substantially gas impermeable sealing layer may penetrate partially or fully into the crystalline matrix via the cracks, pores, or voids.

In some embodiments, the method also includes filling the ceramic structure with a desired gas composition through the hole. In some implementations, the pressure can be applied to the pin by increasing a pressure of the desired gas composition.

In another exemplary aspect, a device for sealing an end of a ceramic structure is disclosed. The device includes a device body that includes a ceramic material and is shaped to include a first surface having a first opening and a second surface having a second opening, wherein the first opening and the second opening form a hollow space in the device body, and wherein the first opening and the second opening form a hollow space in the device body that provides a passage into an inner area of the ceramic structure and can be filled with a sealing material to seal the passage.

In some embodiments, a diameter of the first opening and a diameter of the second opening are substantially the same. In some embodiments, the ceramic material includes silicon carbide (SiC). In some embodiments, the device body includes a subsection that is tapered along a center axis of the device.

In some embodiments, the device also includes a pin shaped to fit into the hollow space as part of the passage in the device body and to press the sealing material to seal the passage. In some implementations, the pin includes a ceramic material.

In another exemplary aspect, a nuclear fuel rod is disclosed. The nuclear fuel rod includes a tubular structure that includes a first ceramic material, a first plug joined with a first end of the tubular structure using a first sealing material; a second plug joined with a second end of the tubular structure using said first sealing material, wherein the second plug comprising a body that is shaped to include a first surface having a first opening and a second surface having a second opening, the first opening and the second opening forming a hollow space in the body of the second plug; a second sealing material disposed within the hollow space of the second plug such that the second material seals the second plug; and one or more nuclear fuel pellets positioned within the tubular structure.

In some embodiments, the ceramic material includes silicon carbide (SiC). The first sealing material may be a preceramic polymer. In some implementations, the preceramic polymer includes a plurality of inclusions. For example, the preceramic polymer is polycarbosilane and the inclusions are in a form of silicon carbide powder. In some implementations, the first plug has a tapered body. The first plug may include a silicon carbide material.

In some embodiments, the body of the second plug includes a section that is tapered along a center axis of the second plug. The second plug may include a silicon carbide material. In some implementations, the second plug includes a pin or insert shaped to fit into the hollow space as part of the passage in the device body and to press the second sealing material to seal the second plug. The pin or the insert may include a silicon carbide material. In some embodiments, the second sealing material includes oxide, silicon, or a transition metal.

In another exemplary aspect, an apparatus for sealing a ceramic structure is disclosed. The apparatus includes a chamber for holding the ceramic structure; a gas inlet coupled to the chamber for directing a gas composition to or from the chamber; and a plurality of coils arranged outside of the chamber, wherein the plurality of coils are capable of induction heating to raise a temperature of a section of the ceramic structure held within the chamber.

In some embodiments, the chamber is made of quartz. The chamber can have a uniform cross-section in some implementations. In some embodiments, the chamber has a small cross-section at a first end and a large cross-section at a second end. For example, a diameter of the first end is around 70 mm. In another example, a diameter of the second end is around 110 mm.

In some embodiments, the gas composition includes He or Ar. In some embodiments, the coils are radiofrequency (RF) coils. In some implementations, the apparatus also includes an outer chamber and a flange that are robust against a high operating temperature. The outer chamber can have a height of around 540 mm.

In another exemplary aspect, a method of sealing a ceramic structure is disclosed to include positioning the ceramic structure into a chamber of a sealing device; disposing a plug on an end of the ceramic structure, wherein a sealing material is positioned between the ceramic structure and the plug; placing a susceptor block adjacent to the plug; and driving a plurality of induction coils arranged outside of the chamber with a varying electric current to heat the end of the ceramic structure and the susceptor block to a high temperature to join the plug and parts of the ceramic structure in contact with the plug at the end of the ceramic structure, thus sealing the end of the ceramic structure.

In some embodiments, the seal is obtained by a chemical vaper infiltration (CVI) process. In some embodiments, the method also includes removing a section of the susceptor block after the seal is obtained. In some implementations, the method further includes placing a layer of silicon between the plug and the susceptor block. The seal can be obtained by a liquid silicon flow process. The layer of silicon can be configured to melt at the high temperature and to react with the susceptor block. In some embodiments, the method also includes directing a gas composition into the ceramic structure before the heating of the end of the ceramic structure.

In yet another exemplary aspect, a system of sealing a ceramic structure is disclosed to include a gas storage to supply a gas composition, an apparatus for sealing a ceramic structure, comprising: a chamber for holding the ceramic structure; a gas inlet coupled to the chamber for directing the gas composition to the chamber; and a plurality of coils arranged outside of the chamber, wherein the coils are capable of induction heating to raise a temperature of a section of the ceramic structure held within the chamber; one or more temperature monitors for monitoring one or more temperatures of the apparatus, and one or more pressure regulators for controlling pressure of the apparatus.

In some embodiments, the one or more temperature monitors include a thermocouple for monitoring a temperature of the ceramic structure. In some implementations, the one or more temperature monitors include a pyrometer to monitor a temperature of the section of the ceramic structure. The one or more temperature monitors may further include a temperature monitor to report a temperature of the chamber.

In some embodiments, the one or more pressure regulators include a back pressure regulator. In some implementations, the system also includes a filter for filtering an exhaust gas emitted from the apparatus. In some embodiments, the system further includes a pre-filter gas pressure monitor for monitoring a pressure of the exhaust gas before passing the filter. The system may also include a post-filter gas pressure monitor for monitoring a pressure of the exhaust gas after passing the filter.

In one exemplary aspect, a device for sealing a ceramic structure with an end plug is disclosed to include a body that is shaped to fit between one opening end of the ceramic structure and the end plug to seal the opening end with the end plug, wherein the body includes a first surface having a first opening, a second surface having a second opening, and a side wall connecting the first surface and the second surface, and wherein the first opening and the second opening form a hollow space in the body to enable the end plug to be coupled to the device.

In some embodiments, the insert also includes a raised part extending from the first surface and protruding from the side wall. In some embodiments, the insert is made of a transition metal. The transition metal may be molybdenum.

In another exemplary aspect, a method of manufacturing an insert for sealing or joining a ceramic structure with an end plug is disclosed. The method includes fabricating a part that includes a body that is shaped to fit between one opening end of the ceramic structure and the end plug to seal the opening end with the end plug. The body includes a first surface having a first opening, a second surface having a second opening, and a side wall connecting the first surface and the second surface. The first opening and the second opening form a hollow space in the body to enable the end plug to be coupled to the part. The method also includes cleaning the fabricated part, and polishing the cleaned part to reduce surface blemish.

In some embodiments, the cleaning is performed using an ultrasonic bath. In some implementations, the polishing of the cleaned part includes electro-polishing the cleaned part in an acid bath.

In yet another exemplary aspect, a method of joining a ceramic structure with an end plug and an insert is disclosed to include placing the insert between the ceramic structure and the end plug to form an assembly, positioning the assembly in an inert gas composition, heating the assembly under a first temperature and a first pressure, and annealing the assembly for a duration of time to relieve interfacial residual stress.

In some embodiments, the inert gas composition is helium. In some embodiments, the first temperature is beyond 1500° C. The duration of time can be between 2 to 4 hours.

In some embodiments, the heating of the assembly includes applying a force to create the first pressure to the assembly, and hot-pressing the assembly under the first temperature and the first pressure. The force may be between 0.5 to 5 kN.

The above and other aspects and their implementations are described in greater detail in the drawings, the description and the claims.

DETAILED DESCRIPTION

Figure 1A:
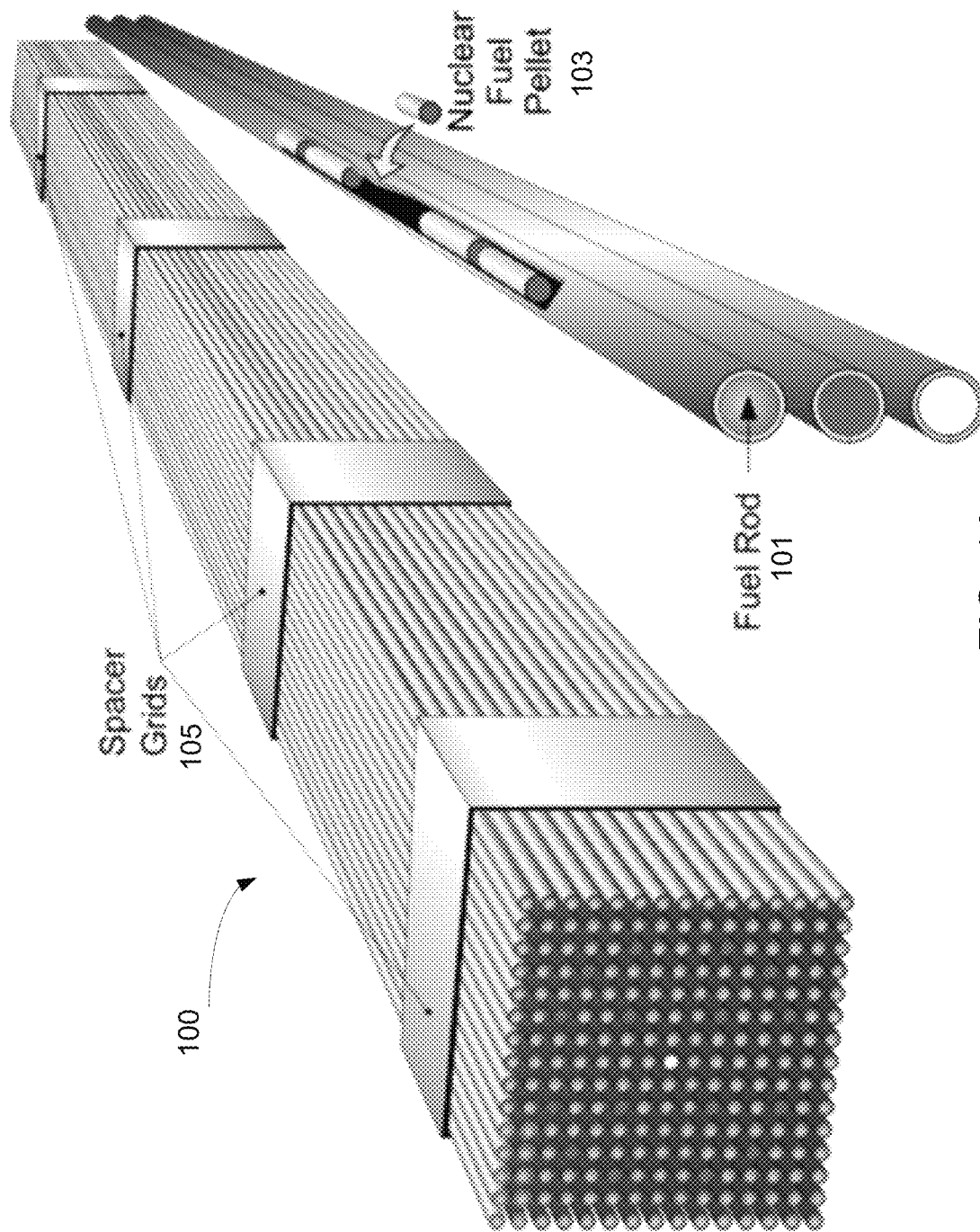
FIG. 1A shows an exemplary fuel assembly for a nuclear reactor.

Nuclear fuel used in a nuclear reactor is usually held in fuel rods capable of enduring high operating temperatures and an intense neutron radiation environment. Fuel structures need to maintain their shape and structural integrity over a long period of time within the reactor core, thereby preventing the leakage of fission products into the reactor coolant of a reactor. FIG. 1A shows an example of a nuclear fuel rod assembly 100 formed of a bundle of fuel rods 101 used in a nuclear reactor. Each rod has a hollow interior to contain nuclear fuel pellets 103 such as Uranium-containing pellets and spacer grids 105 are used to hold the rods in the assembly. A reactor is designed to hold nuclear fuel rod assemblies that provide sufficient nuclear fuels for power generation when the reactor is in operation. Various fuel rods may be implemented. Some nuclear reactors use zirconium cladding, for example. The fuel rods in this document use Silicon carbide ceramic matrix composites (CMCs) for improved performance.

Silicon carbide (SiC) can be used for nuclear applications due to its high temperature strength and chemical inertness. SiC fibers can be used to construct ceramic matrix composites (CMCs) in a high purity SiC matrix (SiC/SiC) to provide increased fracture toughness and can be used as cladding materials for advanced high temperature fission reactors and first wall materials in fusion reactors. SiC/SiC composites can also be designed to enhance reactor safety as cladding for various reactors such as light water reactors (LWRs), where their oxidation kinetics in high temperature steam during accident conditions are superior to zirconium alloys by several orders of magnitude.

Figure 1B:
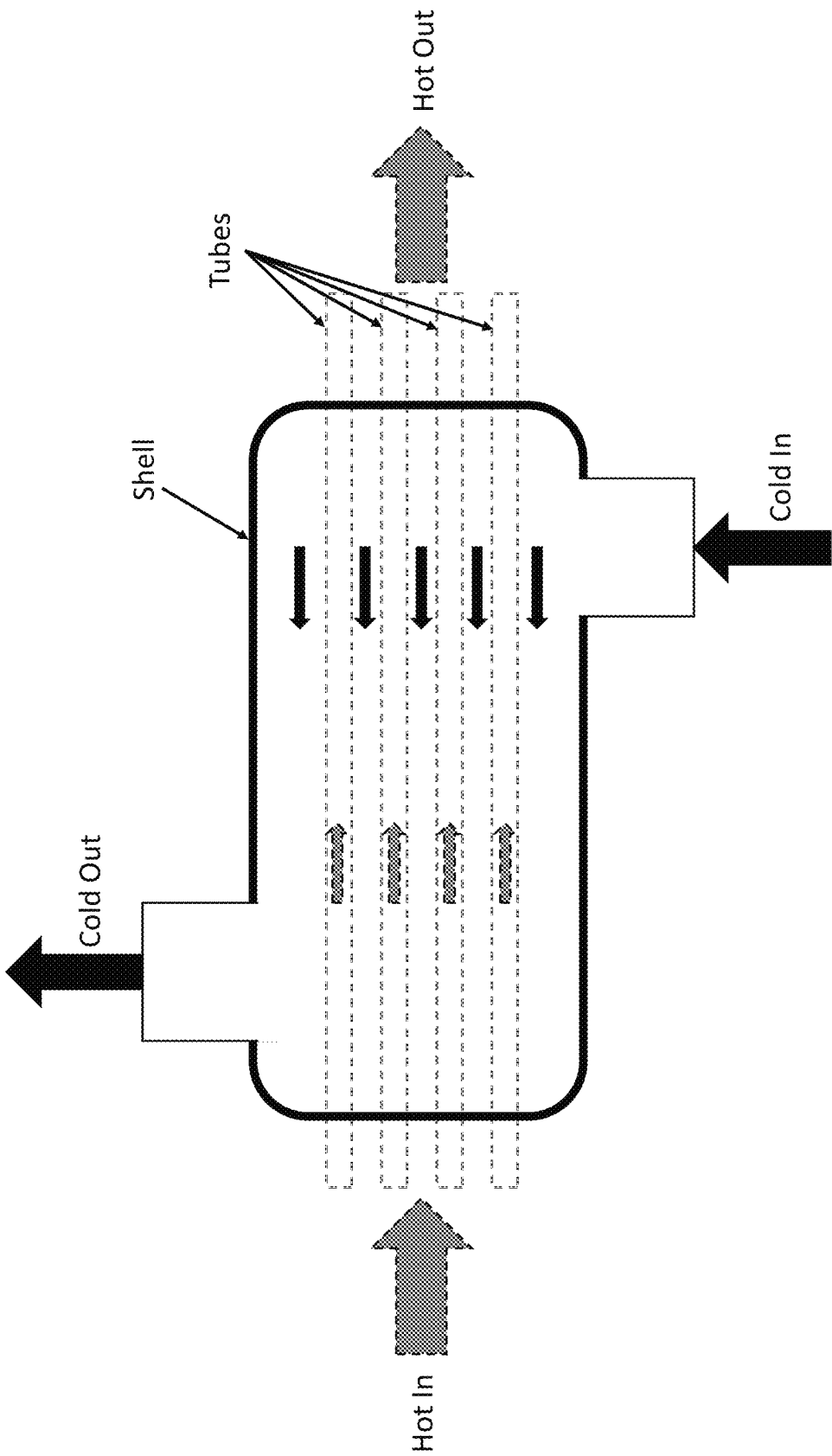
FIG. 1B shows an exemplary heat exchanger for capturing heat.

SiC composites can also be used in variety of high temperature applications such as heat exchangers to recuperate high temperature waste heat from aluminum recycling, syngas production, or gasification-combined-cycle plants. FIG. 1B shows an example of a heat exchanger in a counter-flow heat exchanger configuration used in various applications. In this example, one or more hot fluid channels are provided to direct hot fluid from the left of the heat exchanger into thermal conductive hot fluid tubes to pass through the heat exchange to exit on the right side to release the heat of the hot fluid inside the heat exchanger while a cold fluid is directed into the heat exchanger in a generally opposite direction of the hot fluid in the thermal conductive hot fluid tubes to absorb part of the heat released by the hot fluid and then exit the heat exchange at an elevated temperature. The cold and hot fluids (e.g., gas flows or liquid flows) in this example are in thermal contact for the heat exchange but are separately recycled so the heat energy in the hot fluid is transferred to the cold fluid for a desired use. SiC composites are high temperature compatible and exhibit good corrosion resistance, and can be used in counter-flow and various other heat exchangers to effectively address corrosion problems that are escalating as crude oils are often contaminated with naphthenic acid, sulfur, carbon dioxide and hydrogen sulfide.

The aerospace field also has a wide variety of applications that are an ideal match for the high temperature strength of SiC composites: nosecones, shrouds, airfoils, turbine blades and other jet engine components. In all cases, the geometry of a fiber preform must be maintained during the fabrication process to produce a ceramic matrix composite, near net-shape component.

The manufacture of the SiC composites for various applications usually includes several steps. First, a SiC composite structure is manufactured to include an inner hollow passage through the SiC composite structure which is to be sealed. The Sic composite structure can have a tubular, tubal or non-tubular shape with sidewalls and an inner hollow passage surrounded by the sidewalls. Second, a first end of the SiC structure is joined and sealed with a first SiC end plug. A joint between a first article (e.g., the SiC composite structure) and a second article (e.g., the SiC end plug) may include a matrix comprising a ceramic polymorph that extends between the first and second articles. A plurality of inclusions that includes a ceramic polymorph may be distributed throughout the matrix. In some embodiments, a sealing layer that includes a ceramic polymorph can be applied to the joint surface of the first article (e.g., the SiC composite structure), the second article (e.g., the SiC end plug), and the matrix. The sealing layer may partially extend into the matrix. The matrix, the plurality of inclusions, and the sealing layer each may include the same ceramic polymorph.

Figure 2A:
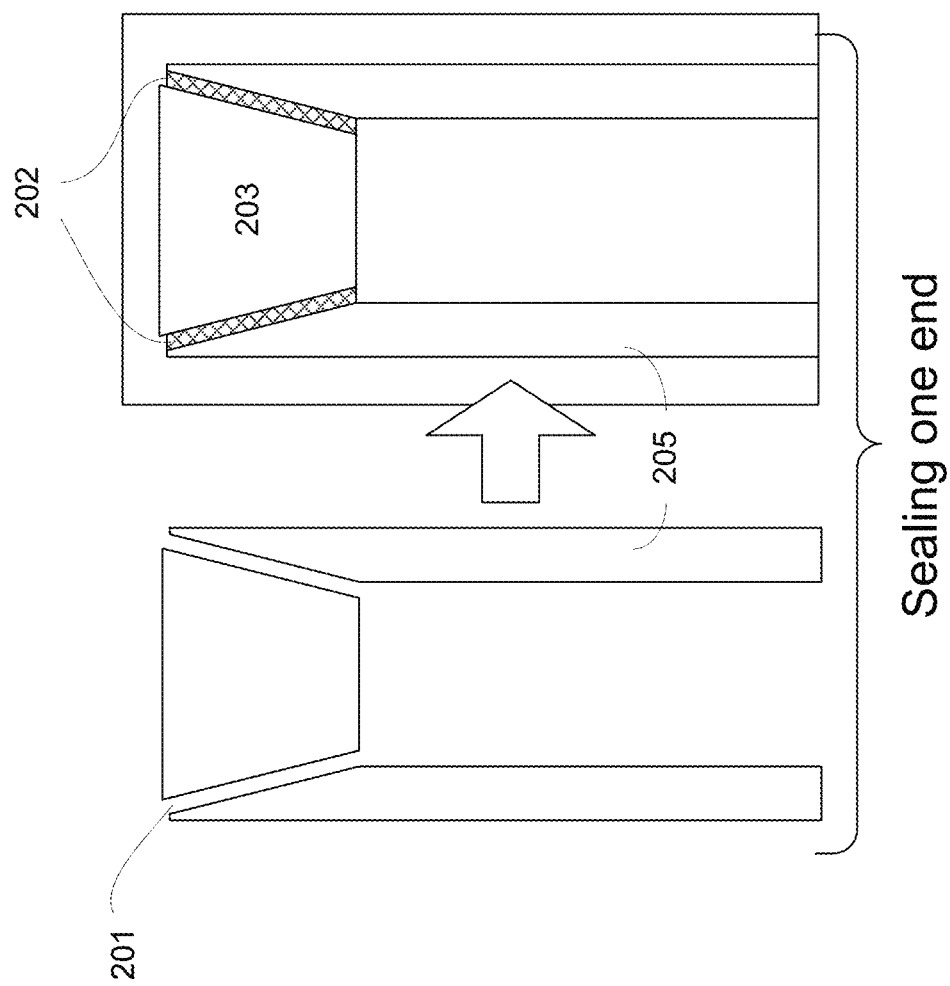
FIG. 2A shows an exemplary schematic diagram of sealing the first end of a SiC structure for a nuclear reactor.

FIG. 2A shows an exemplary schematic diagram of the process for sealing the first end of the SiC structure in form of a SiC tube. In this particular example, the first opening end 201 has a tapered opening with an opening dimension that gradually decreases from the outmost part of the opening towards the inner part of the SiC tube 205. A sealing end plug 203 is designed to have the shape and dimension to fit into the tapered shape of the first opening end 201 of the SiC tube 205. For example, the SiC tube 205 can be a circular tube or a tube of another geometrical shape such as square. For a circular SiC tube 205, the first opening end 201 in the specific example in FIG. 2A is a tapered and tubular opening with a larger opening aperture at the end and gradually decreases towards the inner side of the SiC tube 205. The sealing end plug 203 has an external shape that is tapered and tubular to fit inside the tapered and tubular opening of the first opening end 201 with some small gap in between to provide some room for accepting a sealing material.

Figure 2B:
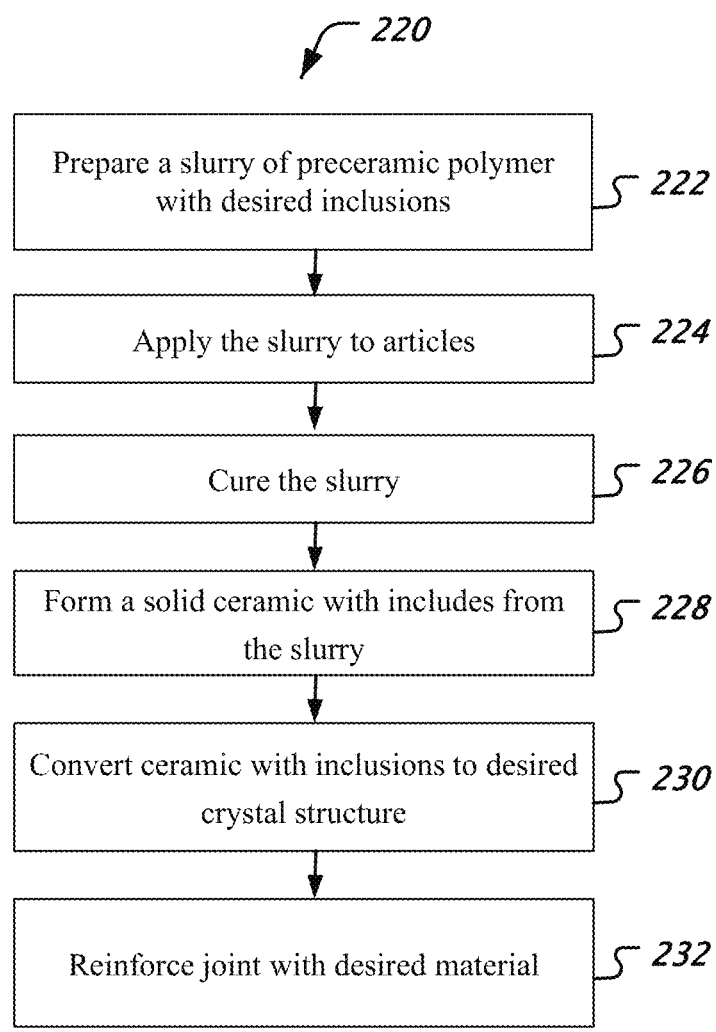
FIG. 2B is a flowchart representation of a method for sealing two articles.

A sealing material 202, such as a preceramic polymer, is applied to form a first joint for filling the slanted interface between the end plug 203 and the opening end of the SiC tube 205 to form a hermetic sealing. FIG. 2B is a flowchart representation of a method 220 for sealing two articles (e.g., the first end of a SiC structure 205 and the end plug 203) using such a sealing material. The method 220 includes, at 222, preparing a slurry of preceramic polymer with desired inclusions. Absent inclusions, the slurry may otherwise form numerous cracks and voids during the formation of joint. Inclusions may occupy and/or prevent the development of at least some of such cracks and voids, thus increasing the overall density of joint and improving the joint's strength and durability. The inclusions may include spheres, flakes, whiskers, fibers, and/or irregular shapes of the material of the articles (e.g., β-SiC) having diameters and/or lengths in the range of nanometers to millimeters. In some embodiments, high aspect ratio inclusions (e.g., having an aspect ratio of 1:2 or greater, or 1:5 or greater, or 1:10 or greater) are believed to be particularly useful for enhancing the mechanical strength and toughness of the joint. For example, matrix having whisker-shaped inclusions may have smaller, rounder voids, and thus more homogeneous. In some embodiments, the preceramic polymer is polycarbosilane (PCS), which is a viscous liquid at room temperature, and the inclusions are in the form of a powder that, in one example, is SiC powder mixed with the liquid via mechanical mixing and ultrasonication.

The method 220 then includes, at 224, applying the slurry to two articles. Here, the two articles are the SiC tube 205 and the sealing plug 203. In some embodiments, the two articles have substantially similar composition. The ceramic polymorph may be, for example, β-SiC. In some embodiments, the matrix, the plurality of inclusions, and the sealing layer discussed before may comprise more than 99.0 wt % β-SiC, or even more than 99.7 wt % β-SiC.

The method 200 also includes curing the slurry at 226 and forming a solid ceramic with inclusions from the slurry at 228. In some embodiments, the applied slurry can be pyrolyzed to form the solid ceramic. Depending on the particular preceramic polymer being used, such pyrolysis may include one or more intermediate steps. Then the solid ceramic is converted to the desired crystal structure at 230.

Figure 2C:
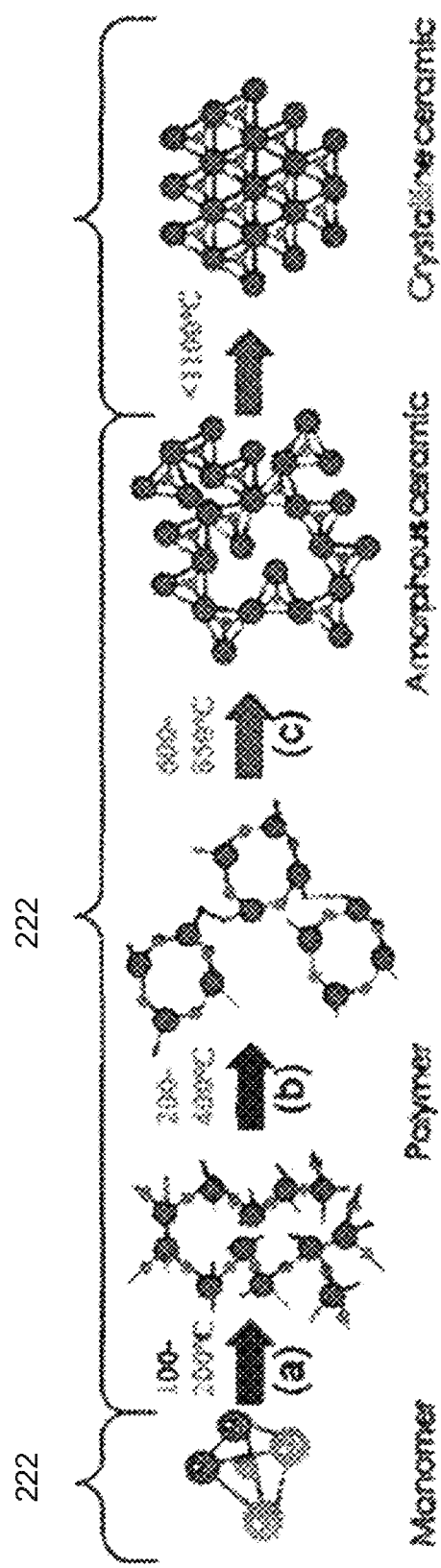
FIG. 2C shows a schematic diagram of intermediate structures during joining.

FIG. 2C shows a schematic diagram of intermediate structures during steps 222, 226, and 228 of the method 220. Ceramic polymer is converted to a ceramic polymorph by the following process: (a) the monomers are polymerized at a relatively low temperature (e.g., 100° C.), (b) the polymer is crosslinked at a high temperature (e.g., 200-400° C.), and (c) the polymer is pyrolyzed at a higher temperature (e.g., 600-850° C.) resulting in formation of an amorphous ceramic. Then, the amorphous ceramic is converted to a crystalline ceramic at a still higher temperature (e.g., greater than 1100° C.). In implementations, the temperature can be selected generate the desired polymorph of the ceramic.

Figure 2D:
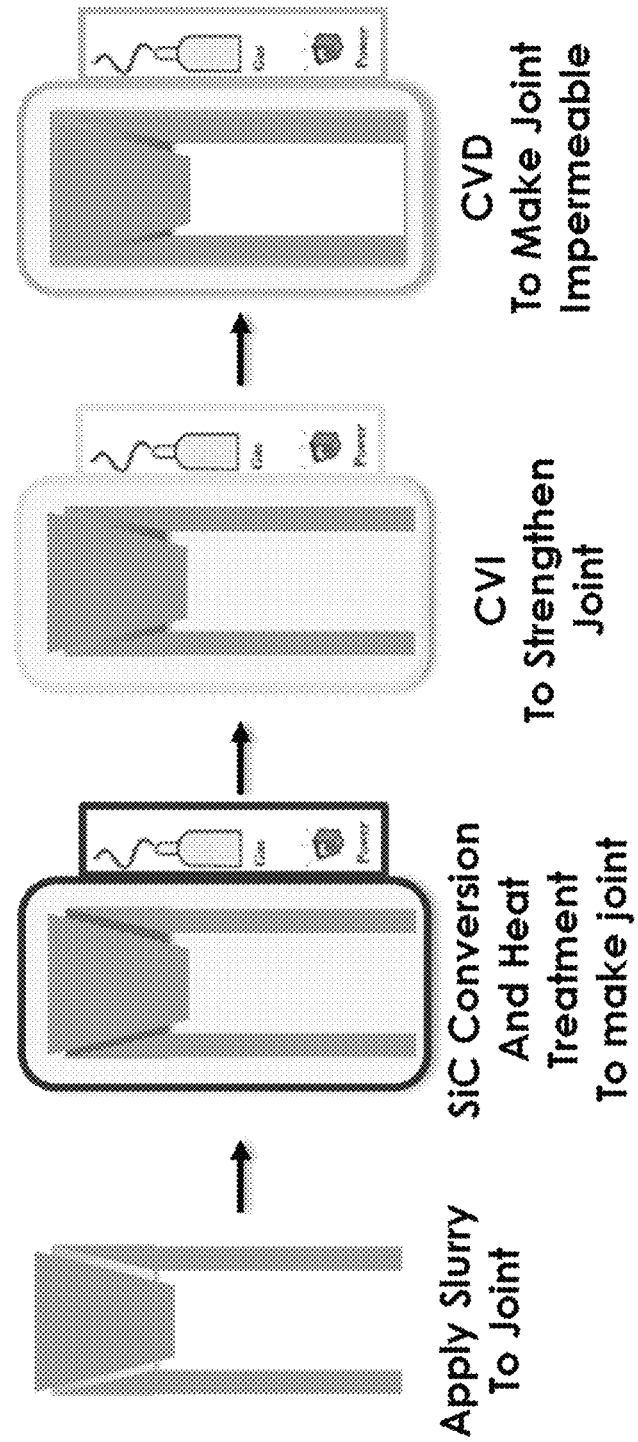
FIG. 2D shows an exemplary schematic diagram of reinforcing a joint.

The method 200 also includes, at 232, reinforcing joint with desired material. As shown in FIG. 2D, in some embodiments, to reinforce and seal the joint, a step of chemical vapor infiltration (CVI) may be performed after the slurry is completely converted to the desired ceramic polymorph, e.g., β-SiC, to form a sealing layer. Indeed, any residual open porosity in the slurry-derived matrix may be used as reactant flow pathways for CVI reactant(s) into the joint and thus partially or fully extend sealing layer into matrix. Such steps are believed to be important for nuclear grade joints, as the ability to retain helium and fission products requires the joint to be structurally sound and substantially impermeable. In some embodiments, a step of chemical vapor deposition (CVD) can further be used to make the joint substantially impermeable.

Sealing the first joint may be implemented in various ways, including, e.g., techniques and materials disclosed in U.S. Pat. No. 9,132,619 B2 entitled "High durability joints between ceramic articles, and methods of making and using same" and granted to General Atomics. The entire disclosure in the U.S. Pat. No. 9,132,619 B2 is incorporated by reference as part of this patent document.

After the first joint at the first end is formed, the SiC tube 205 may be loaded with materials, such as nuclear pellets and retaining springs, or heat exchanger components, via its second opening on the opposite end of the tube 205. The second end of the SiC tube 205 is then joined and sealed with a second SiC end plug in a similar manner to form a second hermetic joint and sealing with the sealing material 202.

There remain some challenges for creating the second joint for the SiC structure. First, for applications in the nuclear field, components such as the nuclear pellets and retaining springs are placed inside of the cladding before the second end is sealed. These components may not withstand the high operating temperature if the sealing of the second end requires heating up the entire cladding structure. Second, it is normal to fill the gap within the cladding with helium gas or other gas compositions to permit a better thermal contact between the nuclear fuel and the cladding. Therefore, it is desirable for the sealing and joining method to hermetically seal the cladding while maintaining an elevated internal pressure in the cladding.

As mentioned previously, several methods can be used for joining ceramic components, including brazes, preceramic polymers, glasses, and ceramics deposited using CVI and/or CVD. However, it can be difficult to use those methods to create a hermetic sealing that maintain an internal pressurization. It is challenging to create the sealing interface that can offer the same advantages, such as such as corrosion, temperature, or irradiation resistance, as the SiC ceramic material. This patent document describes a multi-step joining process that produces a joint exhibiting a combination of these advantages and can make a hermetic resilient joint.

Figure 3A:
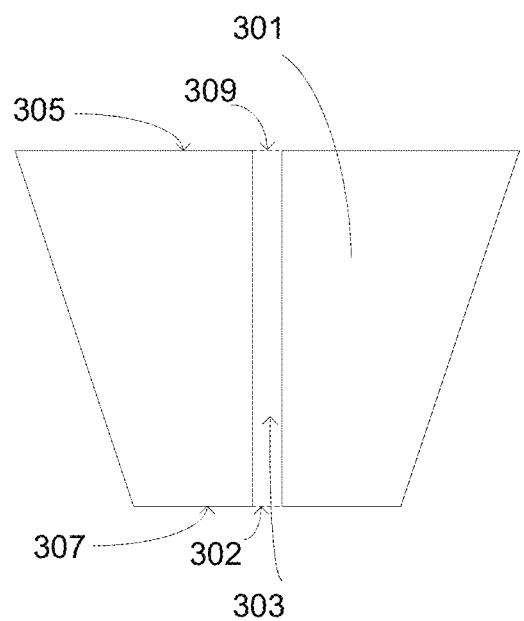
FIG. 3A shows an exemplary schematic diagram of an end plug with a fill-hole.

As part of the mechanism for maintaining an elevated internal pressure in the ceramic structure, a ceramic end plug with a fill hole can be used for sealing the second end of the cladding structure. FIG. 3A shows an example of such a ceramic end plug 301. The end plug 301 has a fill hole 303 of a small diameter that enables gas composition to go through the end plug 301. The end plug 301 can be made of the same material as the SiC composite structure. It is shaped to include a top surface 305 having a first opening 309 and a bottom surface 307 having a second opening 302. The first opening 309 and the second opening 302 form the fill hole 303. The first opening 309 and the second opening 302 can have substantially the same shape so that fill-hole 303 has a uniform cross-section. In some embodiments, the second opening 302 is smaller than the first opening 309 so that they form a tapered fill-hole 303. In some embodiments, the body of the end plug 301 is also tapered to allow a slanted interface between an end plug 301 and an opening end of the SiC structure 205.

With this fill hole 303, the sealing is performed in two steps. First, the end plug 301 is inserted into the opening end of the SiC composite structure, such as the SiC structure 205 as shown in FIG. 2, and the sealing material 202 is used to seal the interface between the end plug 301 and the SiC structure 205. The presence of the fill hole 303 provides a gas conduit between the interior of the SiC structure 205 and the exterior so that a gas system can be coupled to the SiC structure 205. The fill hole 303 can be sealed by applying a high melt-temperature material to flow into the fill hole 303 and to re-solidify in the fill hole 303. Such configuration allows the internal pressure of the cladding to be adjusted after the end plug 301 is placed on the cladding structure and before it is entirely sealed. In some embodiments, the sealing process also includes treating the joined ceramic structure and the end plug at a temperature of at least 1350° C. to further strengthen the seal.

Figure 3B:
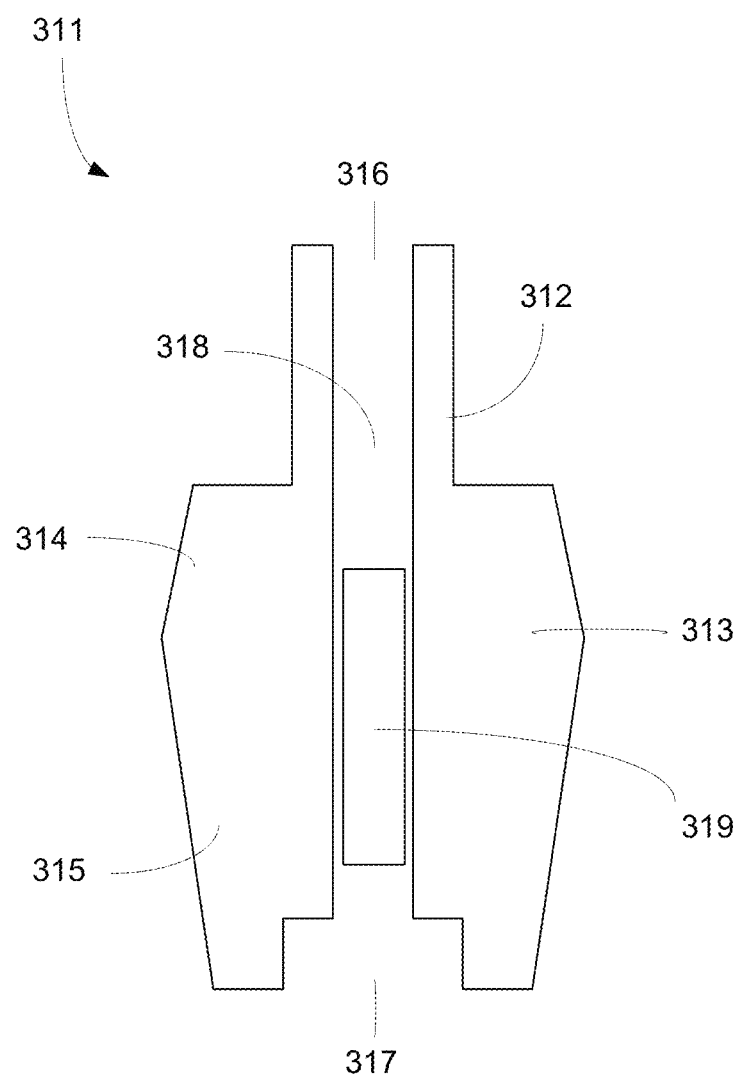
FIG. 3B shows another exemplary schematic diagram of an alternative end plug with a fill-hole.
Figure 3C:
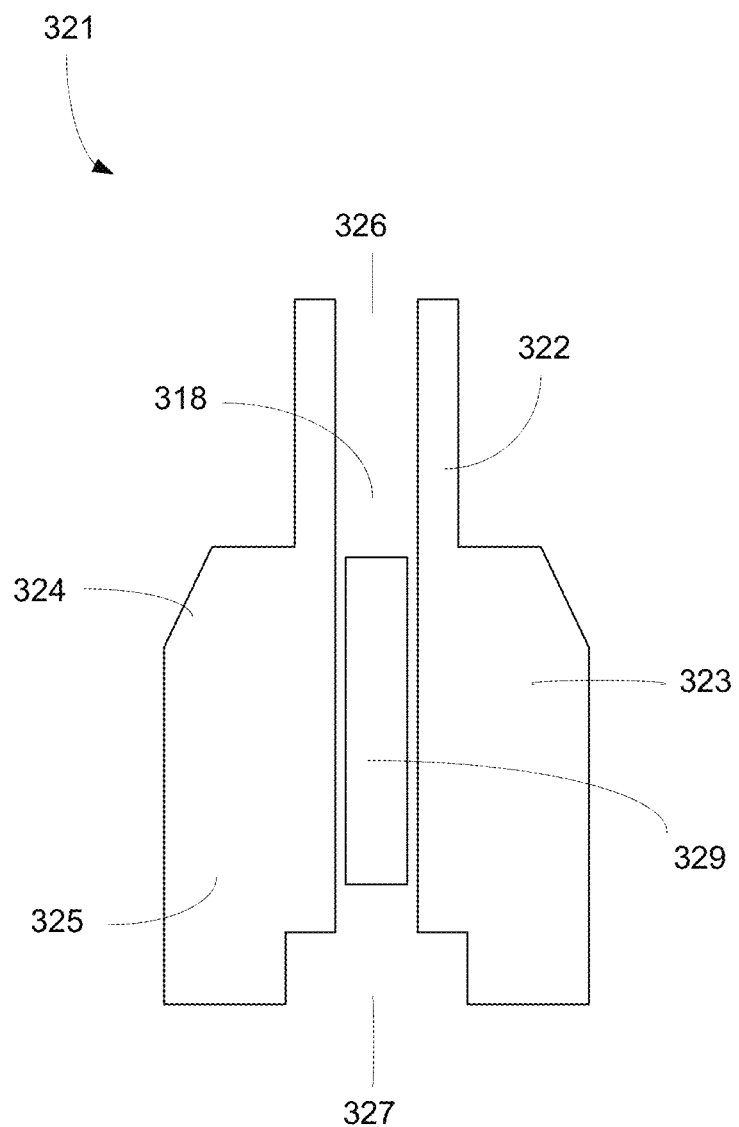
FIG. 3C shows another exemplary schematic diagram of an alternative end plug with a fill-hole.

FIGS. 3B-3C show some schematic diagrams of an end plug with a fill hole. FIG. 3B shows a schematic diagram of an alternative ceramic end plug 311. The end plug 311 includes a tubular neck section 312 that leads to a wider body 313. In some embodiments, the body 313 has two sections: an upper section 314 and a lower section 315. Each of the sections has a tapered shape so that the two sections together form a mirrored frustum. The frustum shape allows a slanted interface between the end plug 311 and an opening end of the SiC cladding 205. The end plug 311 also includes a first opening 316 at the top of the tubular neck section 312 and a second opening 317 at the bottom of the lower section 315 of the body 313. The first opening and the second opening form a fill hole 318. The first opening 316 and the second opening 317 can have substantially the same shape so that fill-hole 318 has a uniform cross-section. In some embodiments, the second opening 317 is smaller than the first opening 316 so that they form a tapered fill-hole 318. In this example, an additional SiC pin 319 is placed in the fill hole 318 to facilitate the sealing process, which will be discussed in connection with FIGS. 7A-7D.

FIG. 3C shows a schematic diagram of an alternative ceramic end plug 321. The end plug 321 has a tubular neck section 322 that leads to a wider body 323. In some embodiments, the body 323 also has two sections: an upper section 324 and a lower section 325. In this example, the upper section 342 has a tapered shape while the lower section 325 has a uniform cross section. The end plug 321 also includes a first opening 326 at the top of the tubular neck section 322 and a second opening 327 at the bottom of the lower section 325 of the body 323. The first opening and the second opening form a fill hole 328. The first opening 326 and the second opening 327 can have substantially the same shape so that fill-hole 328 has a uniform cross-section. In some embodiments, the second opening 327 is smaller than the first opening 316 so that they form a tapered fill-hole 328. In this example, an additional SiC pin 329 is placed in the fill hole 328 to facilitate the sealing process, which will be discussed in connection with FIGS. 7A-7D. It is also noted that while the end plugs are coupled to SiC tubes in the above examples, they can also be coupled to other types of SiC composite structures suitable for a variety of high temperature applications.

Figure 4A:
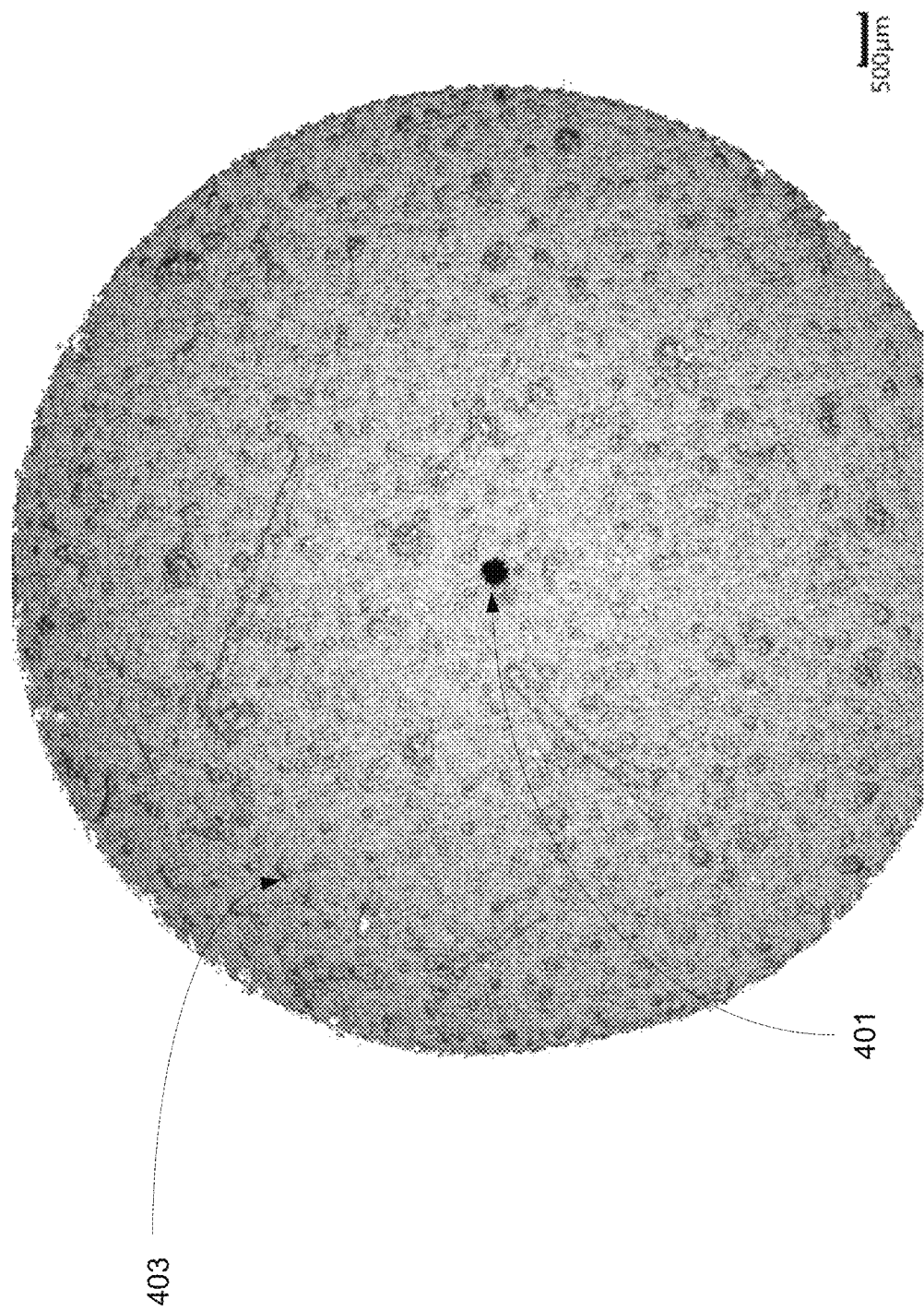
FIG. 4A shows an exemplary fill-hole.
Figure 4B:
FIG. 4B illustrates an exemplary cross section image showing a partial fill-hole in an end plug obtained by X-ray computed tomography (XCT).

FIG. 4A shows an exemplary fill-hole. The fill hole 401 can be created using laser drilling or electrical discharge machining (EDM) of the end plug 403. The fill hole 401 can also be formed integrally by hot pressing the end plug 403 so that geometry of the fill hole is incorporated in the end plug without any extra machining. Sizes of the fill hole depend on properties (e.g. viscosity) of the sealing material and the operating temperature. In some embodiments, the diameter of the holes ranges from 1 to 2 mm. The fill hole 401 can have a substantially uniform cross-section, such as shown in FIG. 3 and FIG. 4A. Alternatively, the fill hole 401 can have a tapered cross-section that narrows as the fill hole 401 gets deeper in the end plug 403 to allow better control of the re-solidification process. FIG. 4B shows an exemplary cross section image of a partial hole 405 in an end plug 407 that was obtained by using X-ray computed tomography (XCT).

Figure 5:
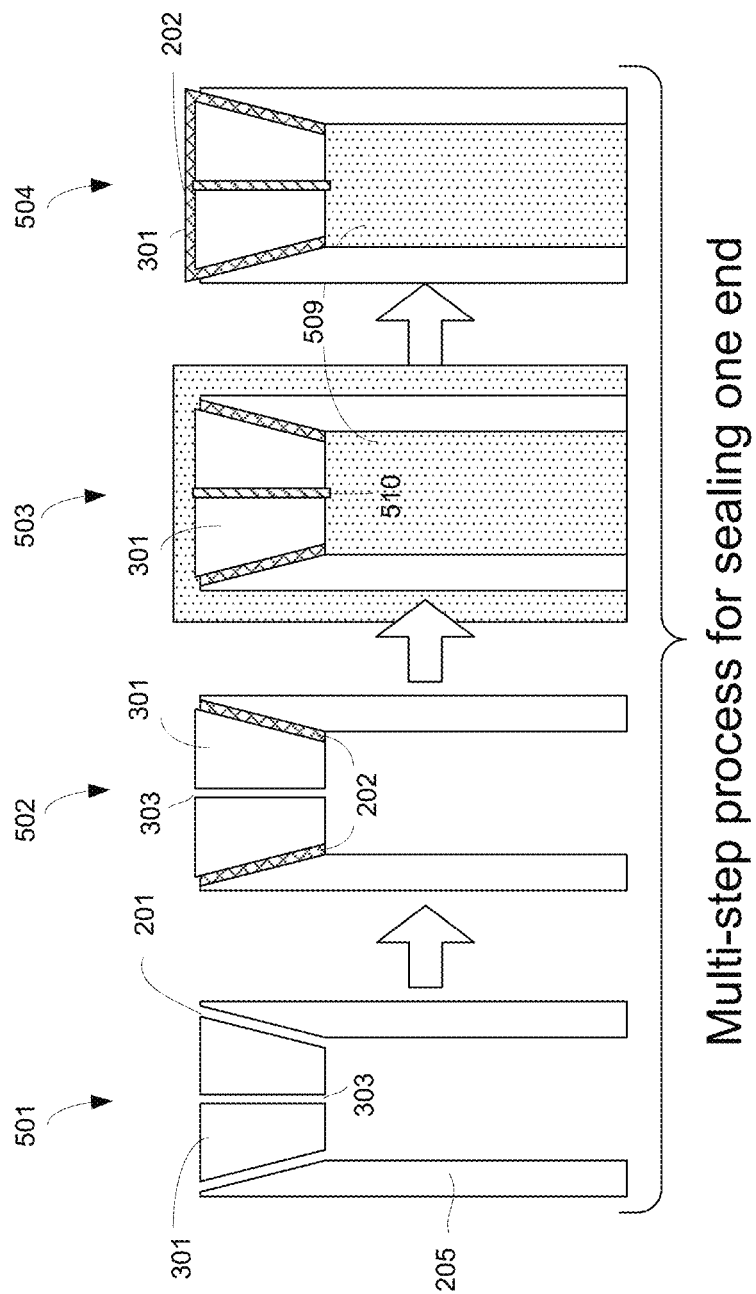
FIG. 5 shows an exemplary schematic diagram for the multi-step approach of sealing the second end of the SiC cladding using the alternative end plug.

FIG. 5 shows an exemplary schematic diagram for the multi-step approach of sealing the second end of the SiC composite structure using the end plug with a fill hole in FIG. 3. The approach utilizes a sequence of steps to join and seal the composite structure, such as ceramic cladding 205, and the second ceramic end plug 301 that contains a fill hole 303. The ceramic cladding tube 205 has two opposite openings and the first opening end is sealed with the first ceramic end plug 203 as shown in FIG. 2. FIG. 5 shows the steps of using the end plug with a fill hole in FIG. 3 to seal the second opening end. In the first step 501, the second ceramic end plug 301 is placed on the second opening of the cladding after components, such as nuclear pellets (not shown), are loaded into the cladding 205. The second step 502 of the process is similar to the step used to form the first joint as shown in FIG. 2. This step 502 uses a sealing material 202, such as the preceramic polymer as discussed above, to form a joint between the end plug 301 and the cladding 205. In the second step 502, procedures such as chemical vapor infiltration (CVI) or chemical vapor deposition (CVD) can be performed to strengthen the joint interface. In some embodiments, the existing gases in the cladding tube 205 are vacuumed out to create a low internal pressure for CVD to complete successfully. Then the ceramic cladding tube 205 can be filled with a desired gas composition 509 via open fill hole 304. Then, at an elevated pressure level caused by the desired gas composition 509, a molten high melt-temperature material 510 (e.g. oxide, silicon, transition metal, etc.) is directed to flow into the fill hole 304 and re-solidify within the fill hole, thereby sealing the fill gas 509 in the cladding 205. In step 504, an additional CVD step can also be performed so that the final surface is substantially the same as the parent material.

Figure 6:
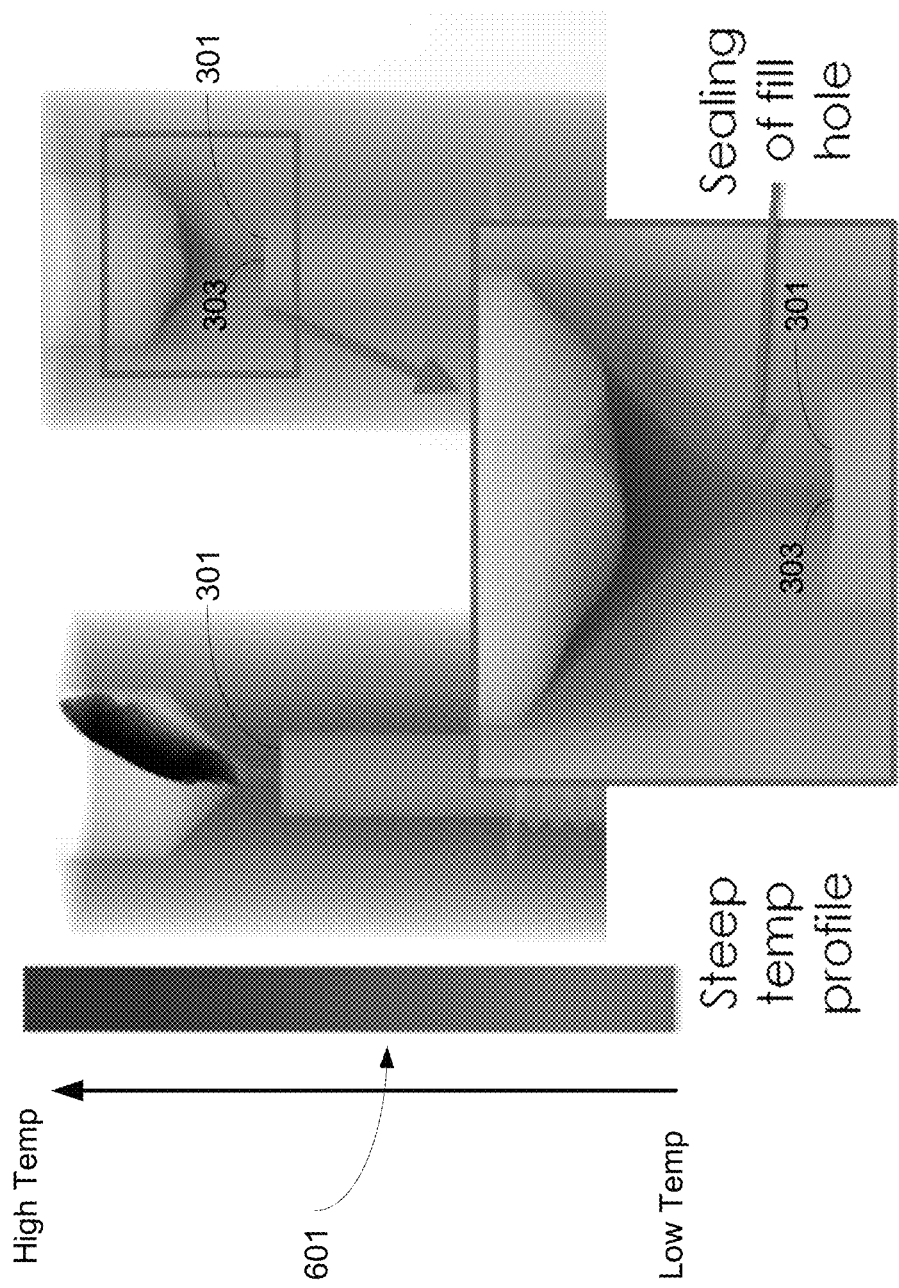
FIG. 6 shows an exemplary configuration to seal the fill-hole.

FIG. 6 illustrates an exemplary configuration to seal the fill hole 303. This configuration utilizes a steep temperature profile 601 presented near the end of the end plug 301 for achieving the sealing. The steep temperature profile 601 maintains a very high temperature a few inches above the end plug 301 to allow the sealing material 510 to stay in a liquid form. The steep temperature profile 601 also keeps a much lower temperature around the fill hole 303 to allow the sealing material 510 to successfully solidify in the fill hole 303.

First, the sealing material 510 is melted, using a heat source, to a liquid form at a high temperature. Then, as the sealing material 510 flows from a few inches above the end plug 301 and down the much cooler fill hole 303, the temperature profile quickly changes from high temperature to low temperature. The sealing material 510 then re-solidifies and seal the fill hole 303. In some embodiments, the sealing material solidifies as it flows in the fill hole 303. In some embodiments, the sealing material may remain molten until the removal of the heat source to further decrease the temperature around the fill hole 303.

Figure 7A:
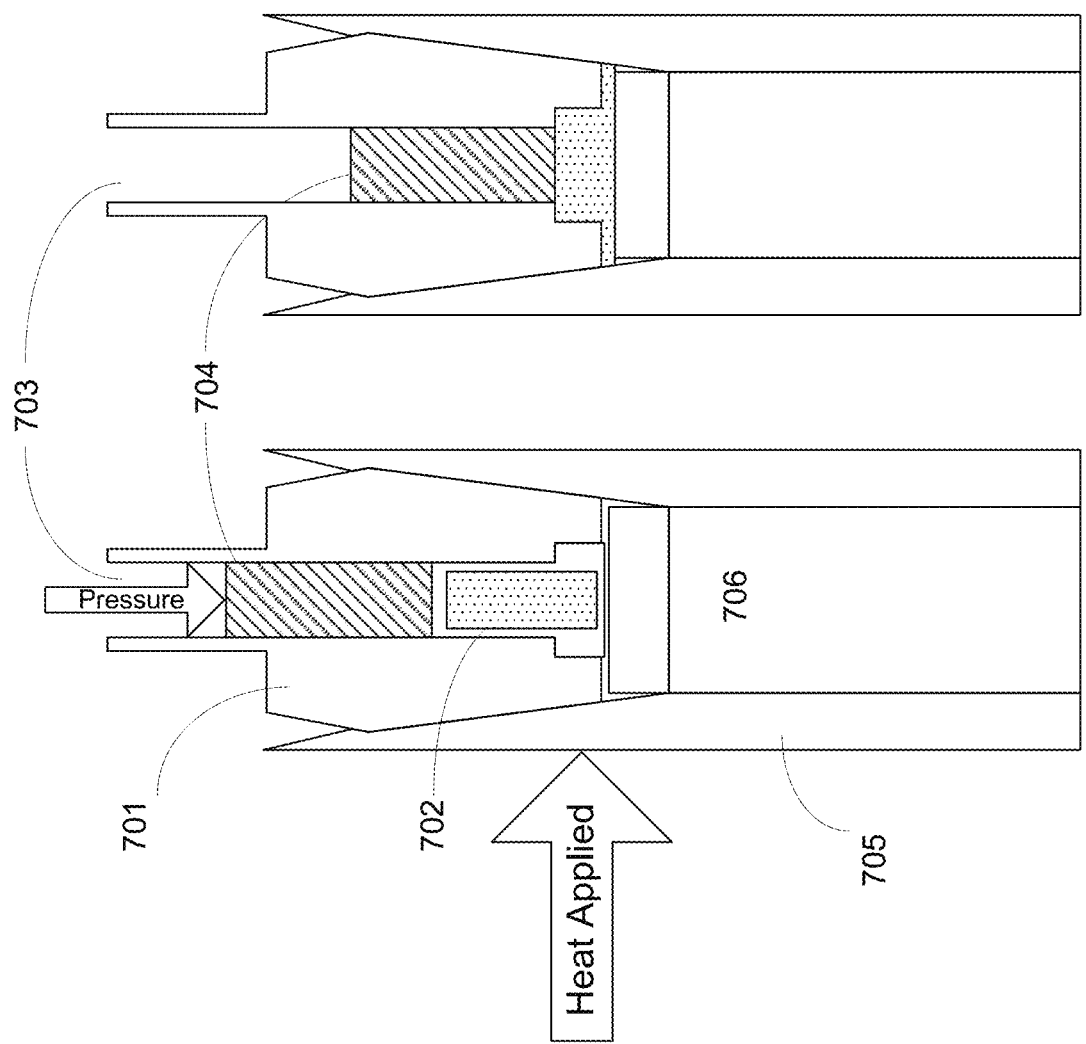
FIG. 7A shows an exemplary configuration to seal the fill-hole with a pin.

FIG. 7A shows an exemplary configuration to seal the fill hole with a pin. In this example, an end plug 701 having a mirrored frustum shape is used. Similar to step 501 in the process shown in FIG. 5, after components 706, such as nuclear pellets, are loaded into the composite structure 705, the end plug 701 and the composite structure 705 can be joined using a sealing material (not shown), such as the preceramic polymer as discussed above. Another type of sealing material 702 can be placed into the fill hole 703 before the sealing of the fill hole starts. The end plug 701 also includes a pin 704 that is made of SiC or other materials. In order to seal the fill hole 703, localized heat can be applied to areas around the end plug 701 to heat up the sealing material 702. Specificity regarding localized heat will be discussed detail in connection with FIGS. 11-13. Pressure can be applied to the pin 704 at the same time so that the pin 704 can press the heated sealing material 702 to form a seal. In some embodiments, as shown in FIG. 7A, the pin 704 has a diameter substantially similar to the diameter of the fill hole 703 so that the sealing material 702 is pressed to the bottom of the end plug 701 to form an internal seal. In some implementations, the pin 704 can have a smaller diameter than the diameter of the fill hole 703 so that the sealing material 702 can be pressed around the pin 704 to seal the fill hole 703.

Figure 7B:
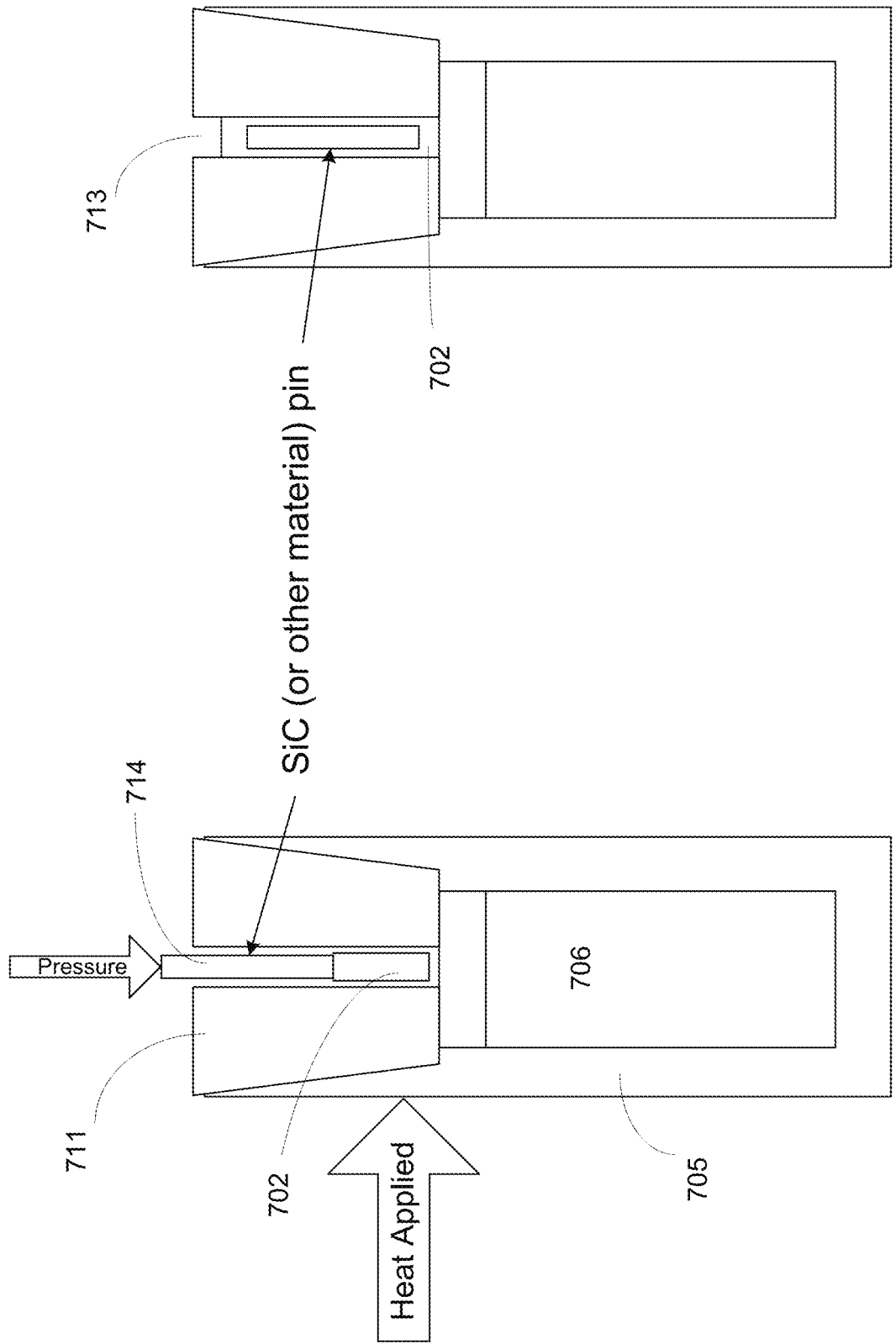
FIG. 7B shows another exemplary configuration to seal the fill-hole with a pin.

FIG. 7B shows another exemplary configuration to seal the fill hole with a pin. In this example, an end plug 711 having a tapered shape is used. Similar to step 501 in the process shown in FIG. 5, after components 706, such as nuclear pellets, are loaded into the composite structure 705, the end plug 711 and the composite structure 705 can be joined using a sealing material (not shown), such as the preceramic polymer as discussed above. Another type of sealing material 702 can be placed into the fill hole 713 before the sealing of the fill hole starts. The end plug 711 also includes a pin 714 that is made of SiC or other materials. In order to seal the fill hole 713, localized heat can be applied to areas near the end plug 711 to heat up the sealing material 702. Specificity regarding localized heat will be discussed detail in connection with FIGS. 11-13. Pressure can be applied to the pin 714 at the same time so that the pin 714 can press the heated sealing material to form a seal. In some embodiments, as shown in FIG. 7B, the pin 714 has a smaller diameter than the diameter of the fill hole 713 so that the sealing material 702 can be pressed around the pin 714 to seal the fill hole 713. In some implementations, the pin 714 can have a diameter substantially similar to the diameter of the fill hole 713 so that the sealing material 702 is pressed to the bottom of the end plug 711 to form an internal seal.

Figure 7C:
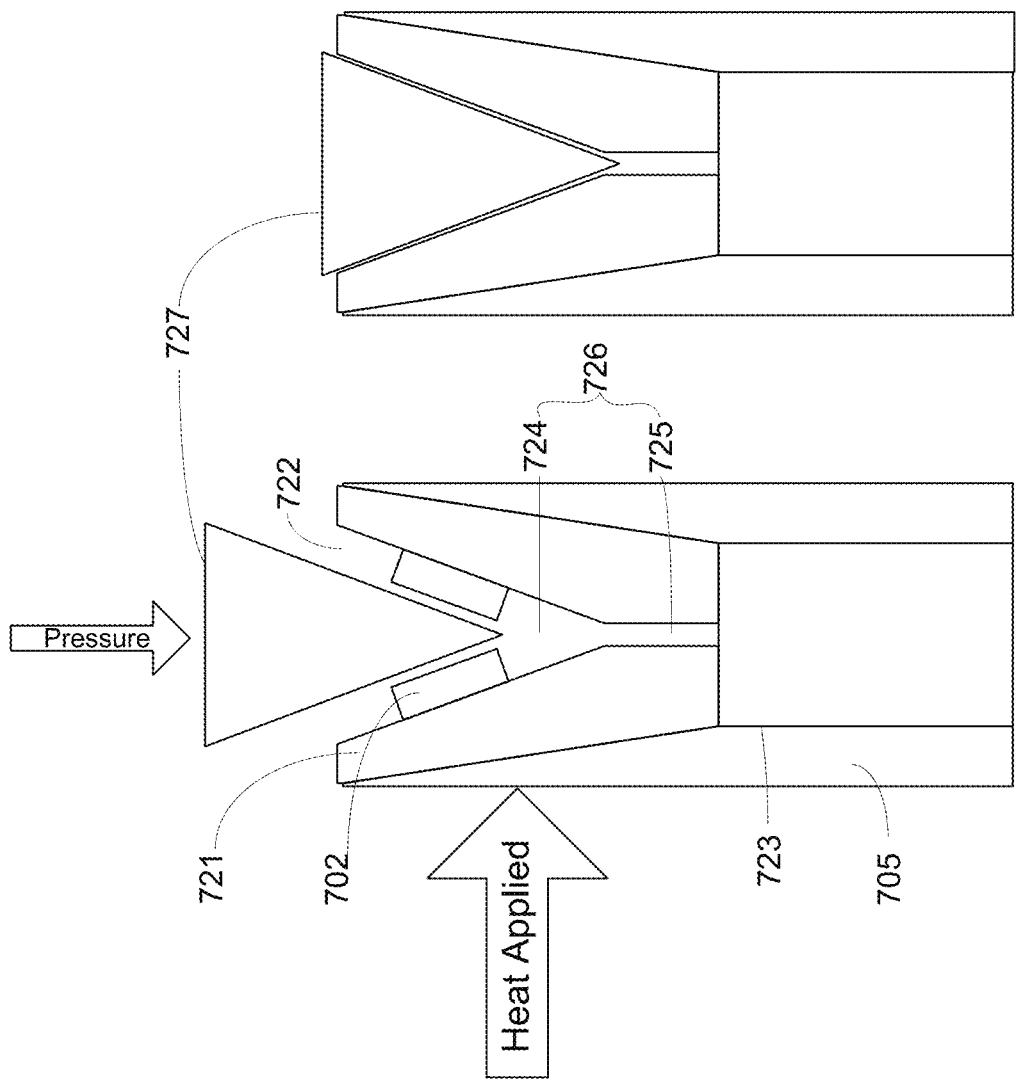
FIG. 7C shows another exemplary configuration to seal the fill-hole with a pin.

FIG. 7C shows another exemplary configuration to seal the fill hole with a pin. In this example, an end plug 721 is used. The end plug 721 has a wide first opening 722 at the top and a small second opening 723 at the bottom. The fill hole 726 thus has two sections: a cone-shaped, wide first section 724 and a narrow second section 725. Similar to step 501 in the process shown in FIG. 5, the end plug 721 and the composite structure 705 can be joined using a sealing material (not shown), such as the preceramic polymer as discussed above. Another type of sealing material 702 can be placed into the wide section 724 of the fill hole 726 before the sealing of the fill hole starts. The end plug 721 also includes a pin 727 that is made of SiC or other materials. In this example, the pin 727 has a corresponding cone shape. In order to seal the fill hole 726, localized heat can be applied to areas around the end plug 721 to heat up the sealing material 702. Specificity regarding localized heat will be discussed detail in connection with FIGS. 11-13. Pressure can be applied to the cone-shaped pin 727 at the same time so that the pin 727 can press the heated sealing material 702 to form a seal in the fill hole 726.

Figure 7D:
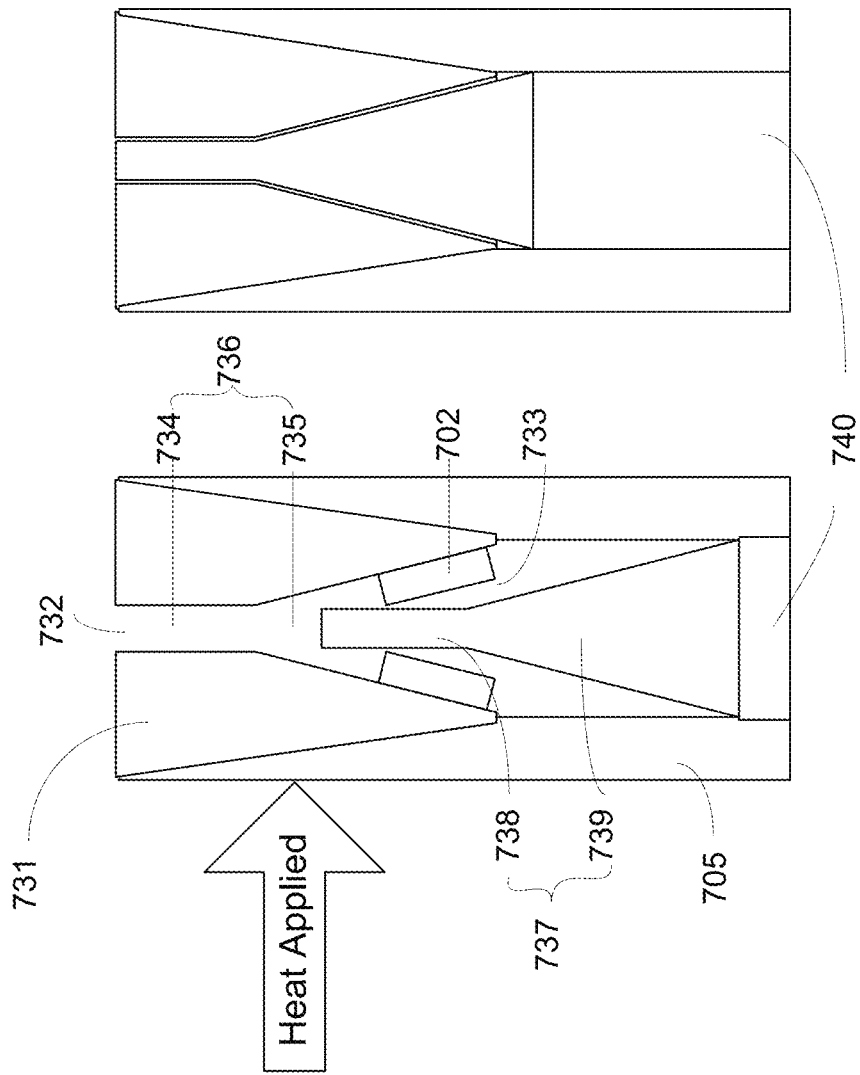
FIG. 7D shows yet another exemplary configuration to seal the fill-hole with a pin.

FIG. 7D shows yet another exemplary configuration to seal the fill hole with a pin. In this example, an end plug 731 is used. The end plug 731 has a narrow first opening 732 at the top and a wide second opening 733 at the bottom. The fill hole 736 thus has two sections: a narrow first section 734 and a cone-shaped, wide second section 735. Similar to step 501 in the process shown in FIG. 5, the end plug 731 and the composite structure 705 can be joined using a sealing material (not shown), such as the preceramic polymer as discussed above. Another type of sealing material 702 can be placed into the wide section 735 of the fill hole 736 before the sealing of the fill hole starts. The end plug 731 also includes a pin 737 that is made of SiC or other materials. In this example, the pin 737 has corresponding two sections: a narrow first section 738 and a cone-shape section 739. The ceramic composite structure 705 can be filled with a desired gas composition 740. In order to seal the fill hole 736, localized heat can be applied to areas around the end plug 731 to heat up the sealing material 702. Heat can also be applied to other sections of the composite structure 705 so that the pressure level of the desired gas composition 740 increases. Then, at an elevated pressure level caused by the desired gas composition 740, the pin 737 presses the heated sealing material 702 to form a seal in the fill hole 736. Specificity regarding localized heat will be discussed detail in connection with FIGS. 11-13.

Figure 8:
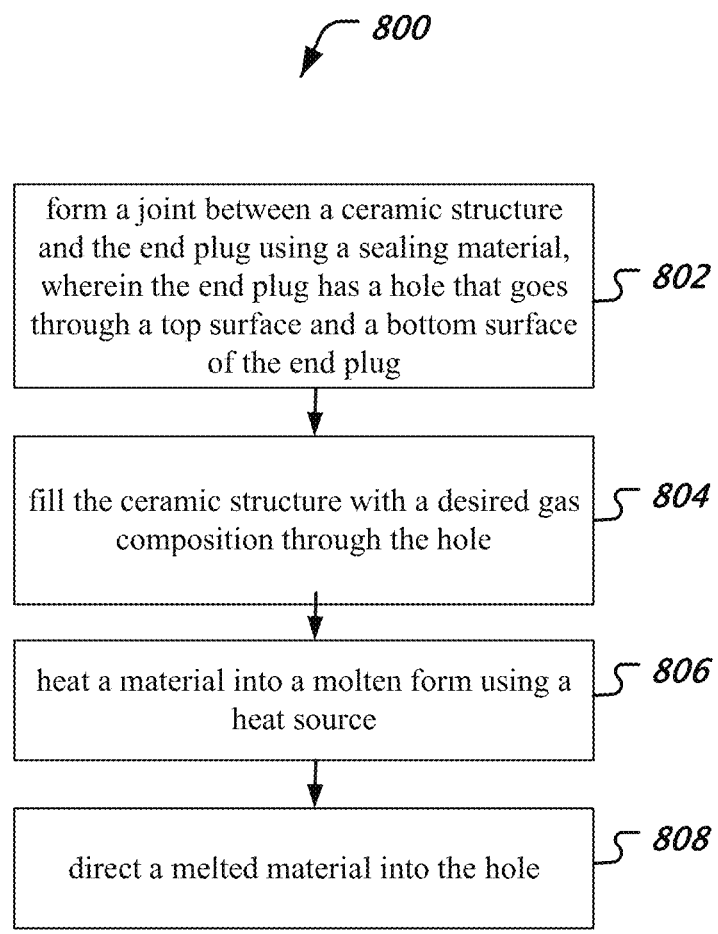
FIG. 8 is a flow chart illustrating an exemplary method of joining and sealing ceramic structures.

FIG. 8 shows an exemplary flow chart for a method 800 of joining and sealing ceramic structures. The method 800 includes: at 802, forming a joint of a ceramic structure and an end plug by a sealing material, wherein the end plug has a hole that goes through a top surface and a bottom surface of the end plug; at 804, filling the ceramic structure with a desired gas composition through the hole; at 806, heating a material into a molten form using a heat source; and, at 808, directing the material to flow into the hole, wherein the material solidifies to seal the end plug.

Figure 9:
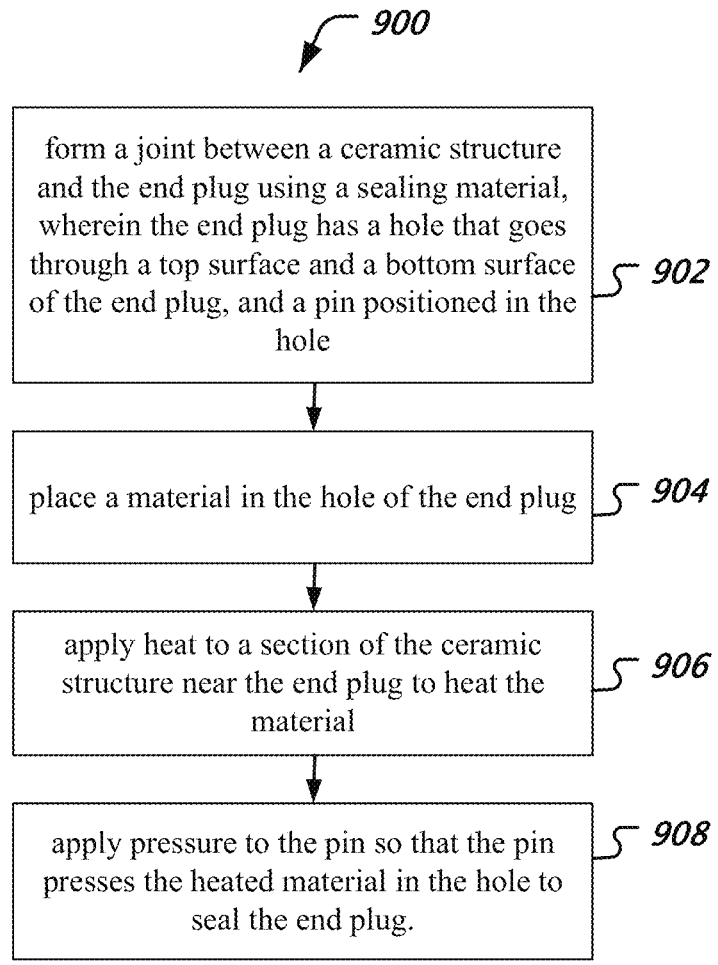
FIG. 9 is a flow chart illustrating another exemplary method of joining and sealing ceramic structures.

FIG. 9 shows an exemplary flow chart for a method 900 of joining and sealing ceramic structures. The method 900 includes: at 902, forming a joint of a ceramic structure and an end plug using a sealing material, wherein the end plug has a body including a hole that goes through a top surface and a bottom surface of the end plug, and a pin positioned in the hole; at 904, placing a material in the hole of the end plug; at 906, applying heat to a section of the ceramic structure near the end plug to heat the material; and, at 908, applying pressure to the body or the pin so that the pin presses the heated material in the hole to seal the end plug.

In some embodiments, the end plug 203, as demonstrated in FIG. 2, can be implemented using a tapered design to allow easier placement of the plug 203 at one end of the SiC structure 205. The taper angle in such a tapered design can vary between 0 to 45 degrees. In some embodiments, a 7° taper angle is used. However, the tapered design also makes the sealing process more complex because it requires a non-uniform application of the sealing material 202 to achieve an irradiation resistant and thermo-mechanically sound hermetic seal between the end plug 203 and the cladding 205. This patent document also describes a transition metal collar that can be used as an insert between the inner surface of the SiC structure and the end plug to provide a mechanically strong and thermal expansion and radiation resistant hermetic seal. The insert can also be used to join SiC structures in various configurations, e.g. forming a large assembly of SiC tubes having T-shaped or elbow-shaped joints.

A transition metal insert can be used between the inner surface of the SiC structure and the end plug. The transition metal insert includes a top surface. The diameter of the top surface is substantially the same as the inner diameter of the structure so that the insert can fit securely into the structure. The top surface has a first opening. The shape and size of the first opening match the shape and size of the larger end of a tapered end plug. The insert also includes a bottom surface that has a diameter substantially the same as the diameter of the top surface. The bottom surface has a second opening that has a shape and size substantially same as the shape and size of the smaller end of the tapered end plug. The top and bottom surfaces are connected by one or more side walls to form a solid body. The first and second opening on the top and bottom surfaces form a large hollow space in the solid body that allows the end plug to be tightly coupled to the insert.

Figure 10B:
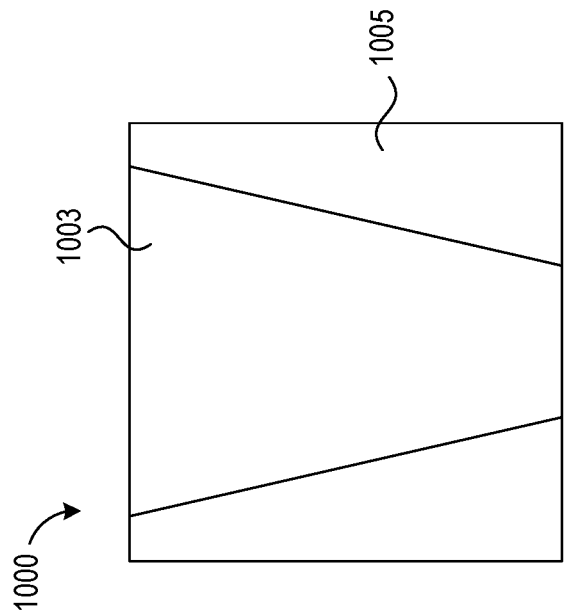
FIG. 10B shows a cross-section of an exemplary insert.
Figure 10A:
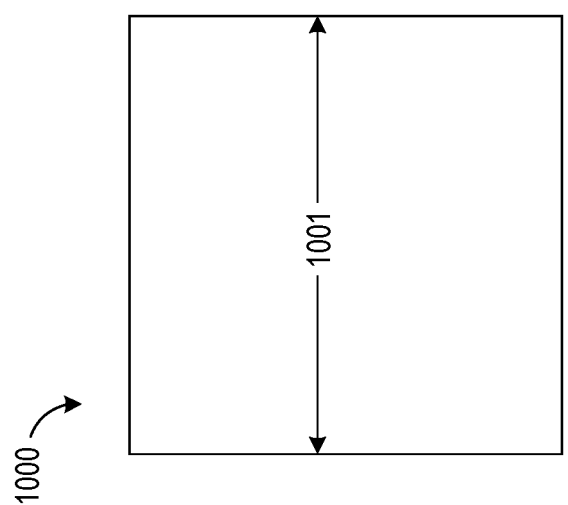
FIG. 10A shows a side view of an exemplary insert.

FIG. 10A shows a side view of an exemplary insert 1000. The diameter 1001 of the insert is substantially the same as the inner diameter of the corresponding SiC structure. The SiC structure can have a variety of shapes for various high temperature applications. FIG. 10B shows a cross-section of an exemplary insert 1000. A hollow space 1003 is formed within the solid body 1005 of the insert 1000 to allow an end plug to be positioned there.

Figure 11B:
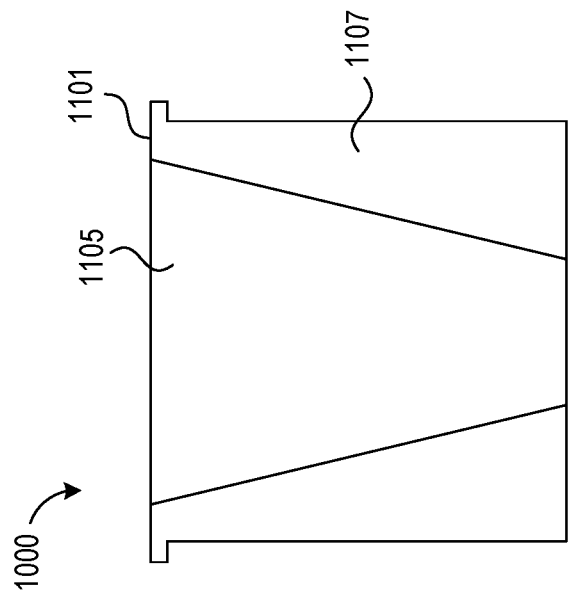
FIG. 11B shows a cross-section view of another exemplary insert.
Figure 11A:
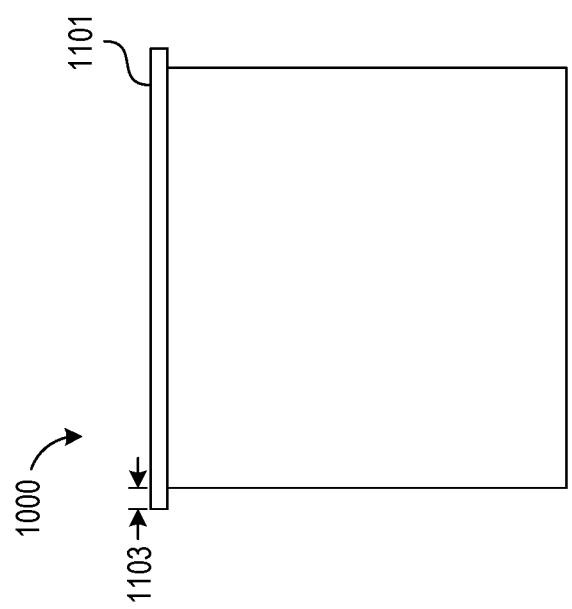
FIG. 11A shows a side view of another exemplary insert.

FIG. 11A shows a side view of another exemplary insert 1100. In this embodiment, the insert 1100 also includes an outer lip 1101. The outer lip 1101 includes a raised part 1103 that extends from the top surface and protrudes from one or more side walls of the insert 1100. The raised part 1103 provides support for the insert 1100 so that the insert 1100 can be placed at the top of an end of the SiC structure without sliding down the structure during the joining or sealing process. The length 1103 of the raised part is substantially the same as the thickness of the structure so that a uniform appearance of the insert and the structure can be achieved at the sealed joint. FIG. 11B shows a cross-section view of an exemplary insert 1100. A hollow space 1105 is formed within the solid body 1107 of the insert 1100 to allow an end plug to be positioned there.

An insert as illustrated in the examples in FIGS. 10A-11B can be fabricated with any transition metal, such as scandium, titanium, chromium, etc. In some embodiments, molybdenum is used. After the insert is fabricated, the fabricated part is cleaned. In some embodiments, the fabricated part can be cleaned using an ultrasonic bath. The cleaned part is then polished to reduce surface blemish. In some embodiments, the cleaned part is electro-polished in an acid bath. The polished insert then can be placed between the end plug and the structure.

Figure 12B:
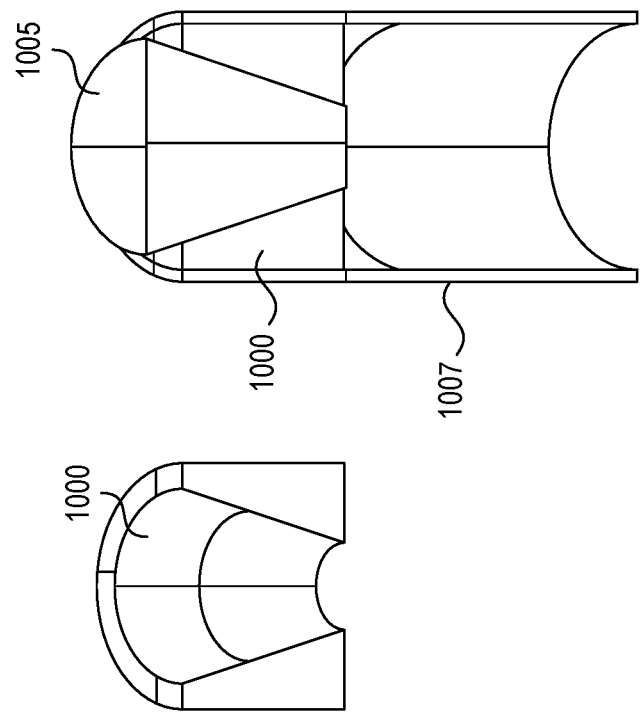
FIG. 12B shows a perspective view of an exemplary insert placed in the cladding structure with an end plug.
Figure 12A:
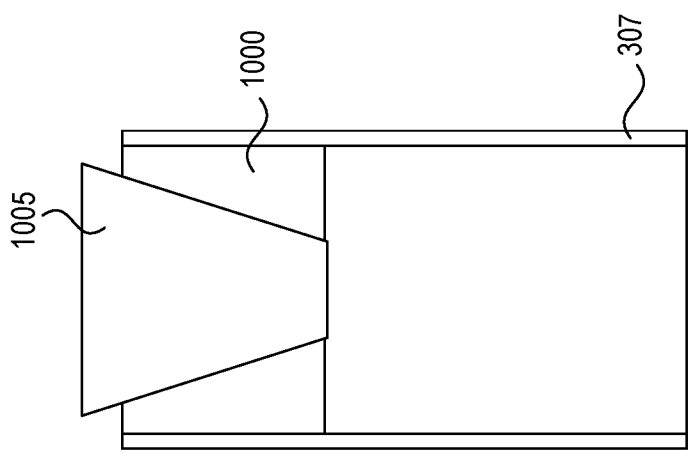
FIG. 12A shows a side view of an exemplary insert placed in the cladding structure with an end plug.

FIG. 12A shows a side view of an exemplary insert 1000 placed in a SiC structure 1007 with an end plug 1005. The end plug 1005 is tightly coupled to the insert 1000, which is positioned securely within the SiC structure 1007. FIG. 12B shows a perspective view of an exemplary insert 1000 placed in the structure 1007 with an end plug 1005. The use of the insert 1000 allows a mechanically strong and thermal expansion and radiation resistant hermetic seal to be formed at the end of the structure 1007.

Figure 13B:
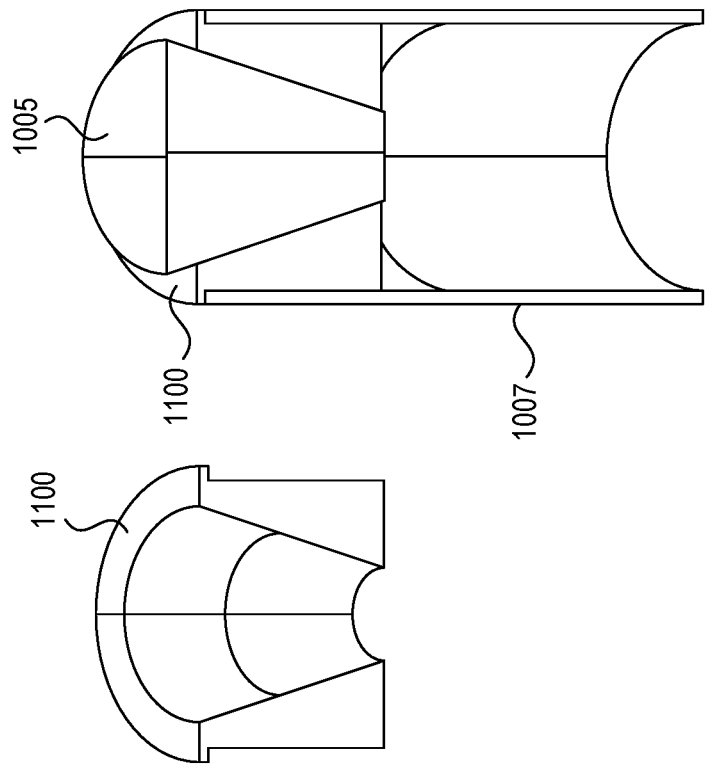
FIG. 13B shows a perspective view of another exemplary insert placed in the cladding structure with an end plug.
Figure 13A:
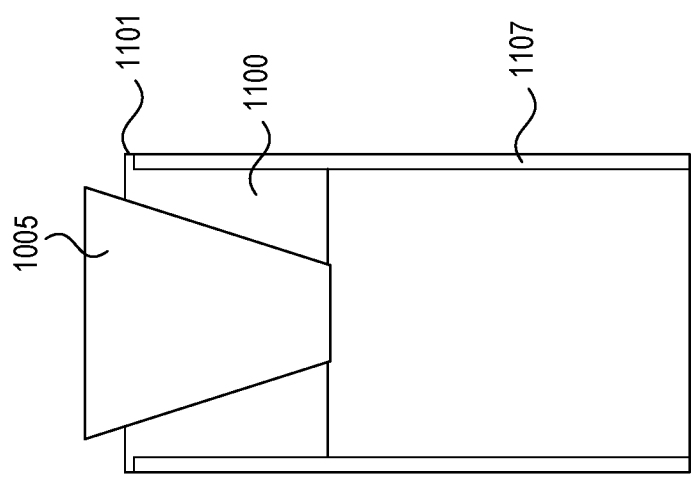
FIG. 13A shows a side view of another exemplary insert placed in the cladding structure with an end plug.

FIG. 13A shows a side view of another exemplary insert 1100 placed in a structure 1007 with an end plug 1005. In this embodiment, the outer lip 1101 ensures that the insert 1100 does not slide down the structure 1007 during the sealing process. FIG. 13B also shows a perspective view of an exemplary insert 1100 placed in the structure 1007 with an end plug 1005.

Figure 14:
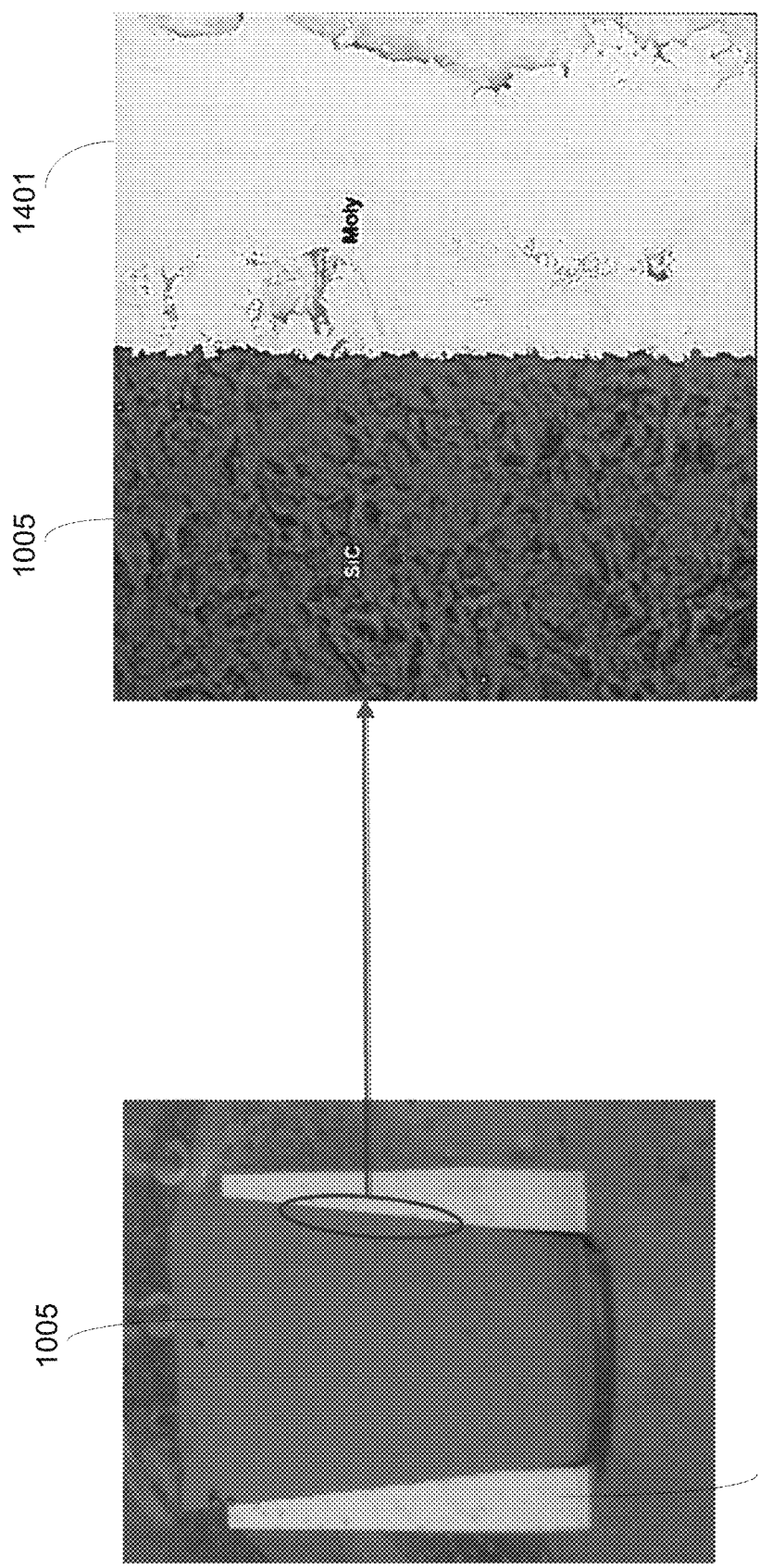
FIG. 14 shows exemplary macro- and microstructures of an insert and a SiC plug after an annealing process.

In some embodiments, the assembly of the insert, the end plug, and the SiC structure is hot pressed in an inert atmosphere to temperatures beyond 1500° C. with pressures varying between 0.5 to 5 kN. The inert atmosphere can be helium, for example. The hot-pressed assembly is then annealed for durations ranging between 2 and 4 hours to relieve interfacial residual stresses. FIG. 14 shows exemplary macro- and microstructures of an insert 1401 and a SiC plug 1005 after an annealing process. In this embodiment, the insert 1401 does not have an outer lip. The microstructure at the interface of the SiC plug 1005 and the insert 1401 demonstrates excellent thermal stitch and anchoring that indicates plastic deformation and annealing.

Figure 15:
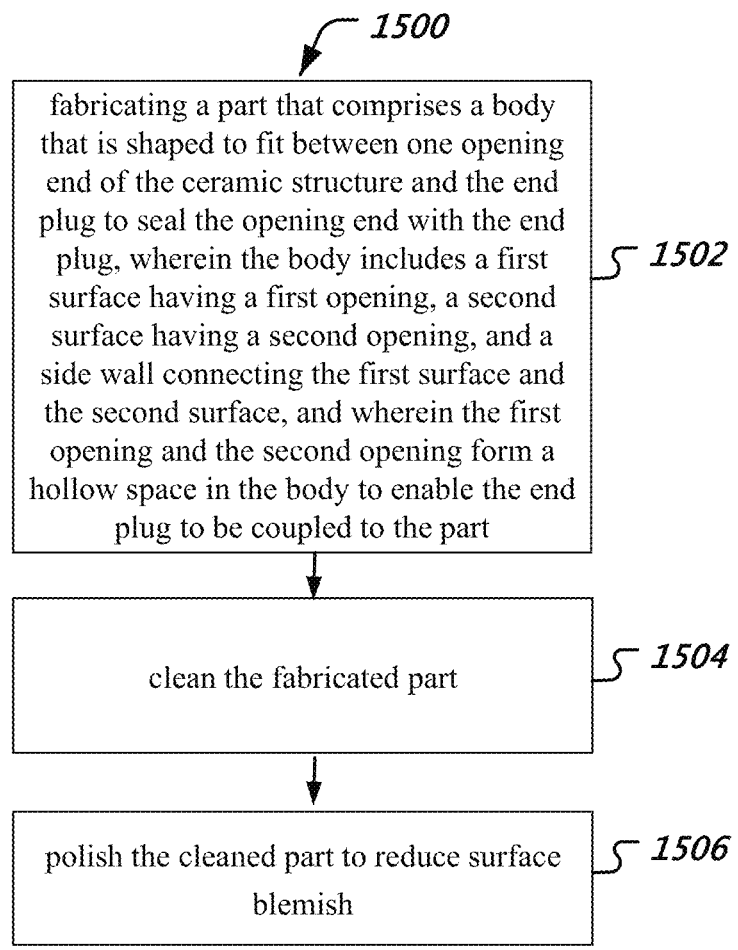
FIG. 15 shows an exemplary flow chart for a method of manufacturing an insert for sealing a ceramic structure with an end plug.

FIG. 15 shows an exemplary flow chart for a method 1500 of manufacturing an insert for sealing a ceramic structure with an end plug. The method 1500 comprises: at 1502, fabricating a part that comprises: a body that is shaped to fit between one opening end of the ceramic structure and the end plug to seal the opening end with the end plug, wherein the body includes a first surface having a first opening, a second surface having a second opening, and a side wall connecting the first surface and the second surface, and wherein the first opening and the second opening form a hollow space in the body to enable the end plug to be coupled to the part; at 1504, cleaning the fabricated part; and, at 1506, polishing the cleaned part to reduce surface blemish.

Figure 16:
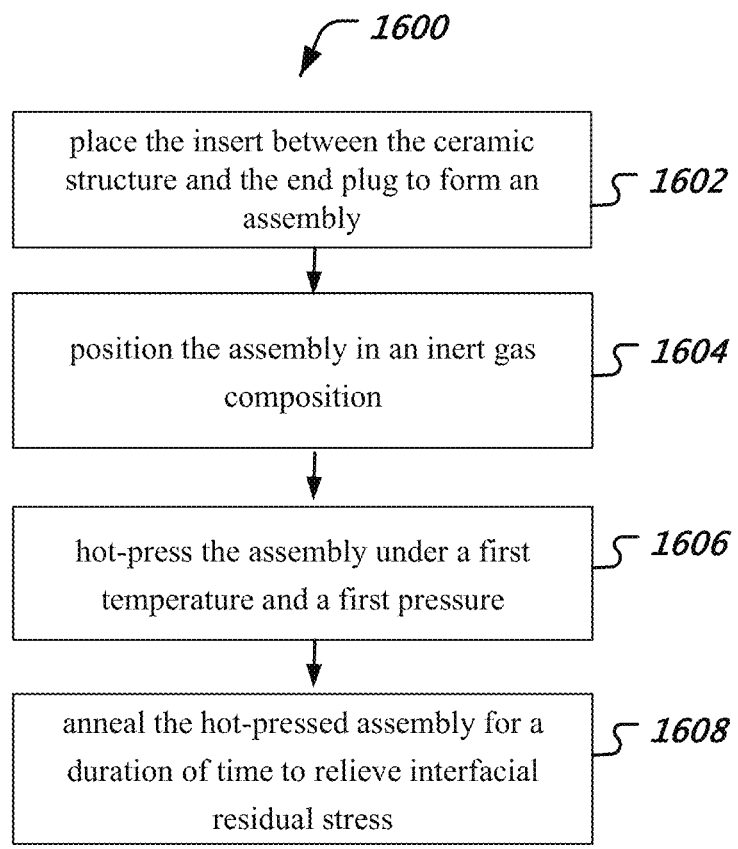
FIG. 16 shows an exemplary flow chart for a method of sealing or joining a ceramic structure with an end plug and an insert.

FIG. 16 shows an exemplary flow chart for a method 1600 of sealing or joining a ceramic structure with an end plug and an insert. The method 1600 comprises: at 1602, placing the insert between the ceramic structure and the end plug to form an assembly; at 1604, positioning the assembly in an inert gas composition; at 1606, hot-pressing the assembly under a first temperature and a first pressure; and, at 1608, annealing the hot-pressed assembly for a duration of time to relieve interfacial residual stress.

Figure 17:
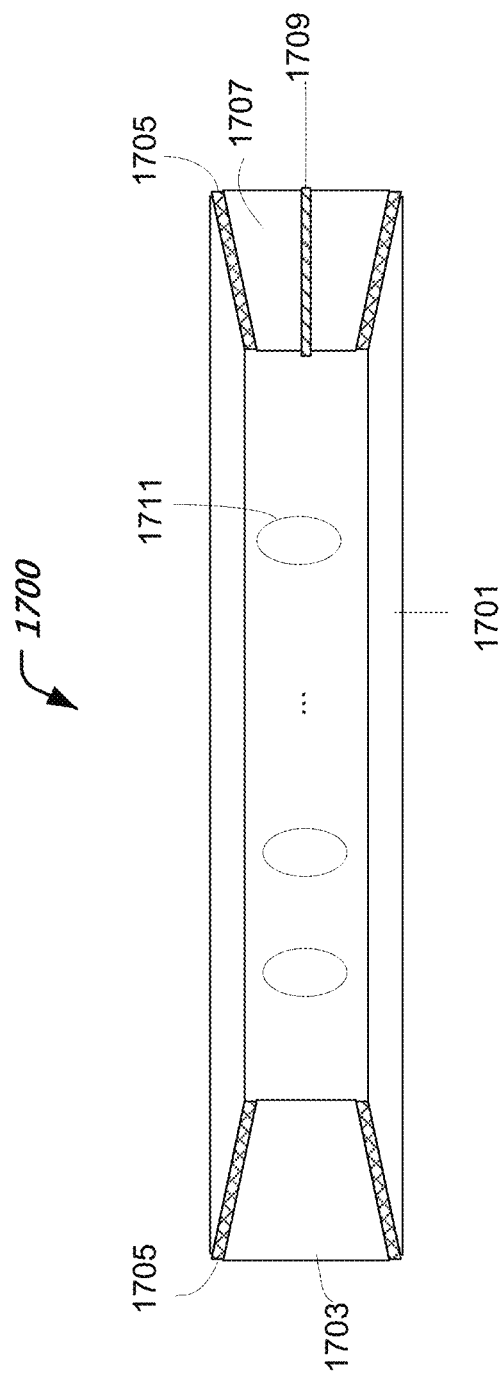
FIG. 17 shows an exemplary fuel rod after joining and sealing both ends of a ceramic structure using processes in accordance with one or more embodiments of the present technology.

FIG. 17 shows an exemplary fuel rod 1700 after joining and sealing both ends of a ceramic structure using processes in accordance with one or more embodiments of the present technology. The fuel rod 1700 now includes a SiC tubular structure 1701, a first end plug 1703 joined with the tubular structure 1701 using a sealing material 1705, and a second end plug 1707 joined with the tubular structure 1701 using the same sealing material 1705. The sealing material 1705 can be the preceramic polymer as discussed above. The fill-hole for the second end plug 1707 is sealed with a second sealing material 1709 (e.g., oxide, silicon, transition metal, etc.) so that all the components now form a sealed nuclear fuel rod 1700 that contains one or more nuclear pellets 1711.

As shown in the embodiments illustrated in FIGS. 7A-D, localized heat play an important role of joining and sealing ceramic structures. Applying conventional sealing or joining methods, however, is insufficient to provide localized heating to create a hermetic joint under a desired internal pressure. This patent document also describes a furnace-type apparatus that facilitates localized heating of the composite structures. The apparatus can sustain a controlled internal pressure, allowing hermetic joints to be made to contain a desired gas composition, which is not feasible using conventional joint processing equipment.

Figure 18:
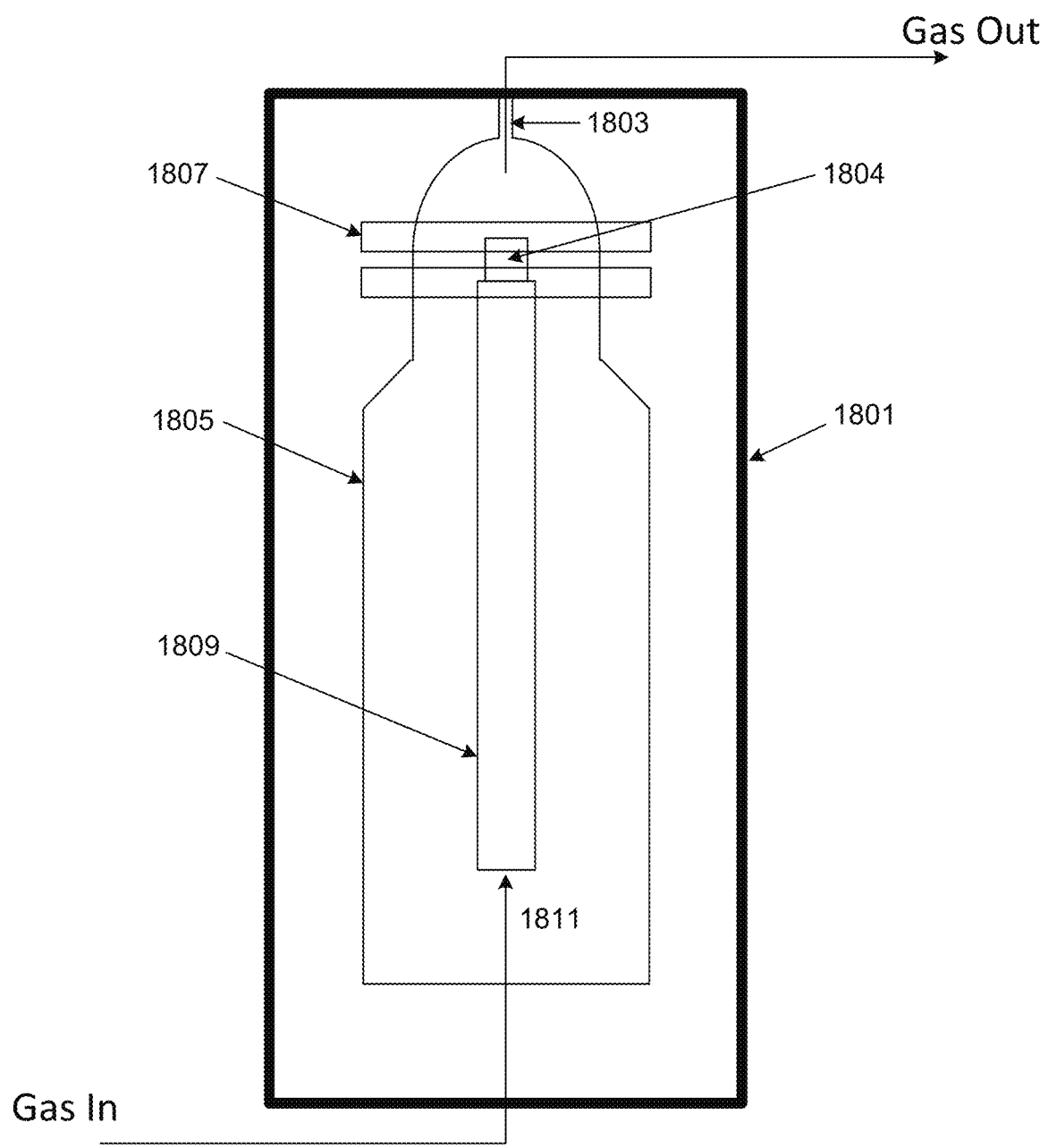
FIG. 18 shows an exemplary schematic diagram of a furnace that can be used for several joining processes to join and seal ceramic parts.

FIG. 18 shows an exemplary schematic diagram of a furnace that can be used for joining and sealing ceramic parts. Examples of the processes used in such a furnace include pyrolysis of preceramic polymers, chemical vapor deposition (CVD), and melt infiltration. The furnace 1800 includes a pressure vessel 1801 that are robust against the operating temperature and pressure. The pressure vessel 1801 is coupled to an inlet tubing mechanism 1811 to allow a gas composition to flow into the pressure vessel. The inlet tubing mechanism 1811 can have a variety of arrangements with regard to the number of tubes and their respective placements to accommodate different sealing requirements. In some embodiments, the inlet tubing mechanism 1811 can be arranged as several evenly-spaced tubes near the bottom of the composite structure 1809 to allow the gas composition to flow into the vessel in parallel. The furnace also includes a narrow tubular section 1803 that is coupled to a gas exhaust. The tubular section is coupled to an inner chamber 1805 that holds the composite structure to be sealed. In some embodiments, the inner chamber 1805 is a Quartz sleeve or a Quartz bell. A heating mechanism can be placed outside of the inner chamber 1805 to heat up an end of the composite structure 1809. For example, as shown in FIG. 18, induction coils 1807 are positioned outside of an upper section of the inner chamber 1805 using electrically-isolating feed-throughs (not shown). The induction coils 1807 are operated by receiving an oscillating electric current at an RF frequency to heat up a section of the composite structure 1809 near an end plug 1804 via induction heating where the varying electric current in the induction coils 1807 causes a varying magnetic field that induces an eddy current in the composite structure, causing heating. The inner chamber 1805, the narrow tubular section 1803 and the gas exhaust are used to direct the flow of reactive gasses used in processes such as CVD. They can also be used for the removal of the excess heat generated in the process. The height of the furnace is determined by the length of the composite structure to be sealed. In some embodiments, the height of the vessel is around 540 mm. In some embodiments, the height of the vessel can be adjusted (e.g., by adding modular sections of pipe to the vessel) to accommodate different lengths of composite structures.

Figure 19:
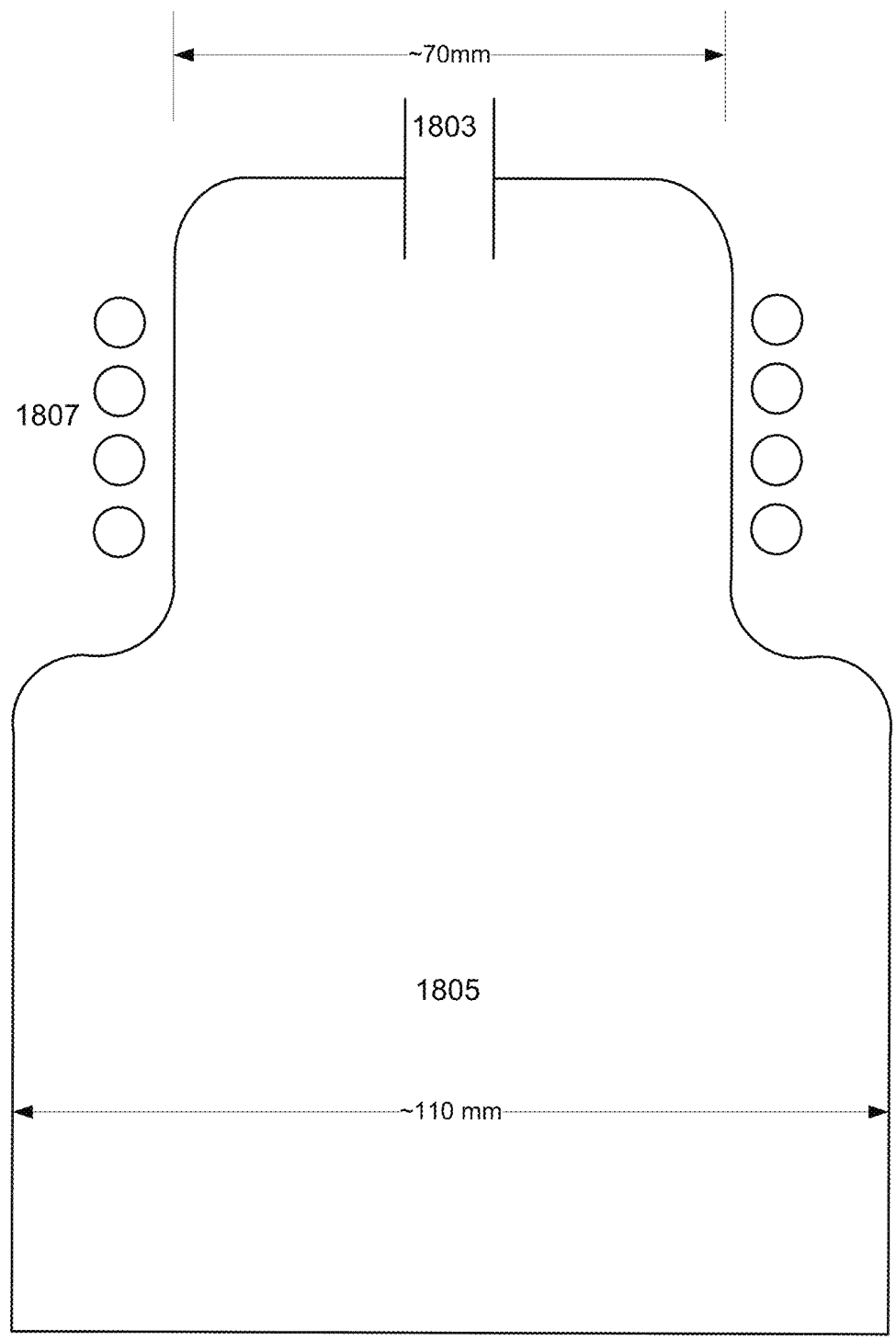
FIG. 19 shows an exemplary schematic diagram of the inner sleeve, the narrow tubal section, and coils.

FIG. 19 shows an exemplary schematic diagram of the inner chamber 1805, the narrow tubular section 1803, and coils 1807. The inner chamber 1805 isolates the gas compositions from the walls of the furnace 1800. In some embodiments, the inner chamber 1805 also directs the flow of the gas compositions across the composite structure to be coated. In this embodiment, the inner chamber 1805 is a quartz sleeve having non-uniform cross sections along the sleeve body. The diameter of the quartz sleeve near the coils 1807 is around 70 mm, while the diameter of other sections of the quartz sleeve is around 110 mm.

Figure 20:
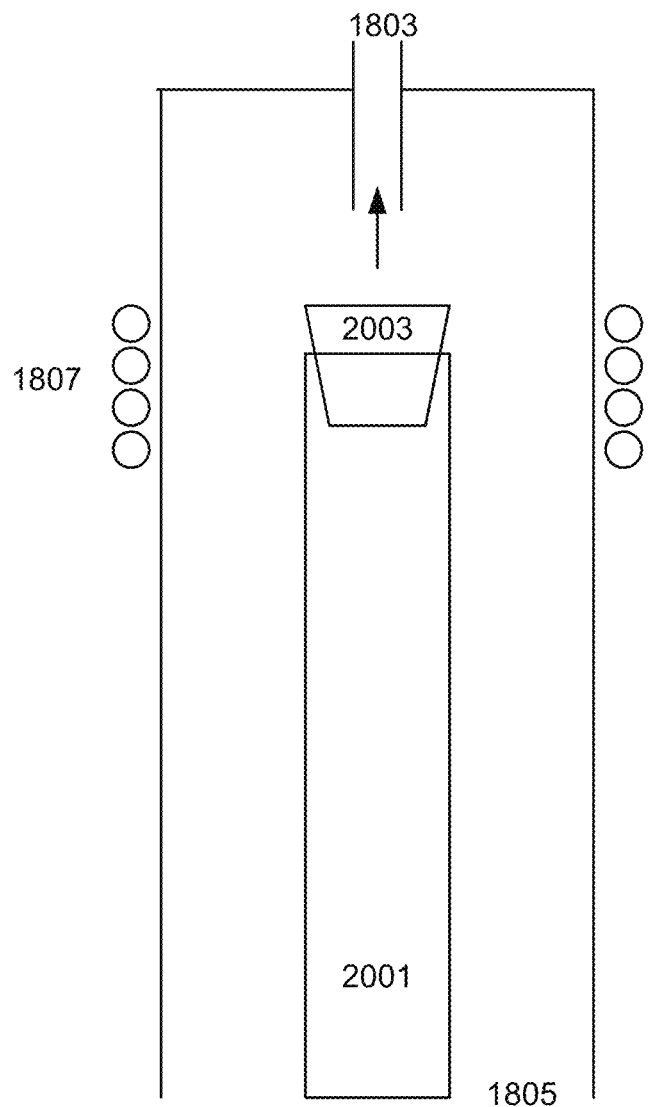
FIG. 20 shows another exemplary schematic diagram of the inner sleeve, the narrow tubal section, and coils.

FIG. 20 shows another exemplary scheme diagram of the inner chamber 1805, the narrow tubular section 1803, and coils 1807. In this particular embodiment, the inner chamber 1805 has a uniform cross section along the body. In this example, a composite structure 2001 is placed inside of the inner sleeve. The composite structure 2001 has an end plug 2003 positioned at one end of the structure 2001.

Figure 21:
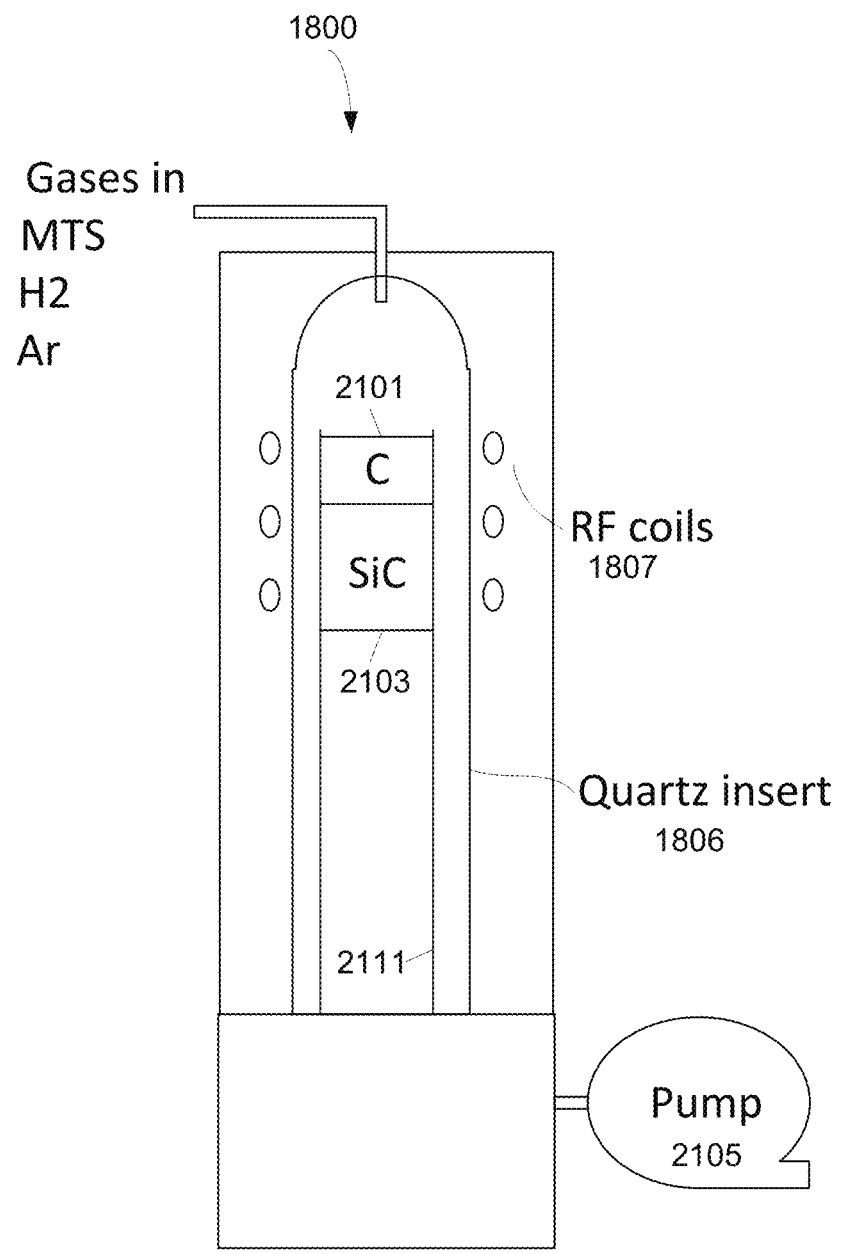
FIG. 21 shows an exemplary configuration of the furnace system for a chemical vapor infiltration (CVI) process.

FIG. 21 shows an exemplary configuration of a furnace system for implementing a CVI process. In this particular embodiment, a pump 2105 is connected to the furnace 1800 to control the pressure within the furnace 1800. A heating mechanism is positioned within the furnace 1800 to provide localized heating to an end of the composite structure. For example, the heating mechanism can be implemented using RF coils. A current is directed through the RF coils 1807 to heat up a portion of the quartz sleeve 1805 by induction heating to allow localized sealing of the composite structure 2111. In this exemplary setup, a susceptor block 2101 is placed over the SiC end plug 2103. In operation, the susceptor block 2101 absorbs the electromagnetic energy emitted by the RF coils 1807 and converts the absorbed energy into heat that facilitates the heating of the SiC seal plug 2103 underneath the susceptor block 2101 and the heating of adjacent regions of the composite structure 2111 for joining the SiC seal plug 2103 and the composite structure 2111. Upon completion of this heated joining process, the joint junction between the SiC seal plug 2103 and the composite structure 2111 so formed exhibits a good mechanical strength that is beneficial to the composite fabrication process. After the joining/sealing process completes, the top part of the susceptor block 2101 may be removed, e.g., being cut or machined away.

Figure 22:
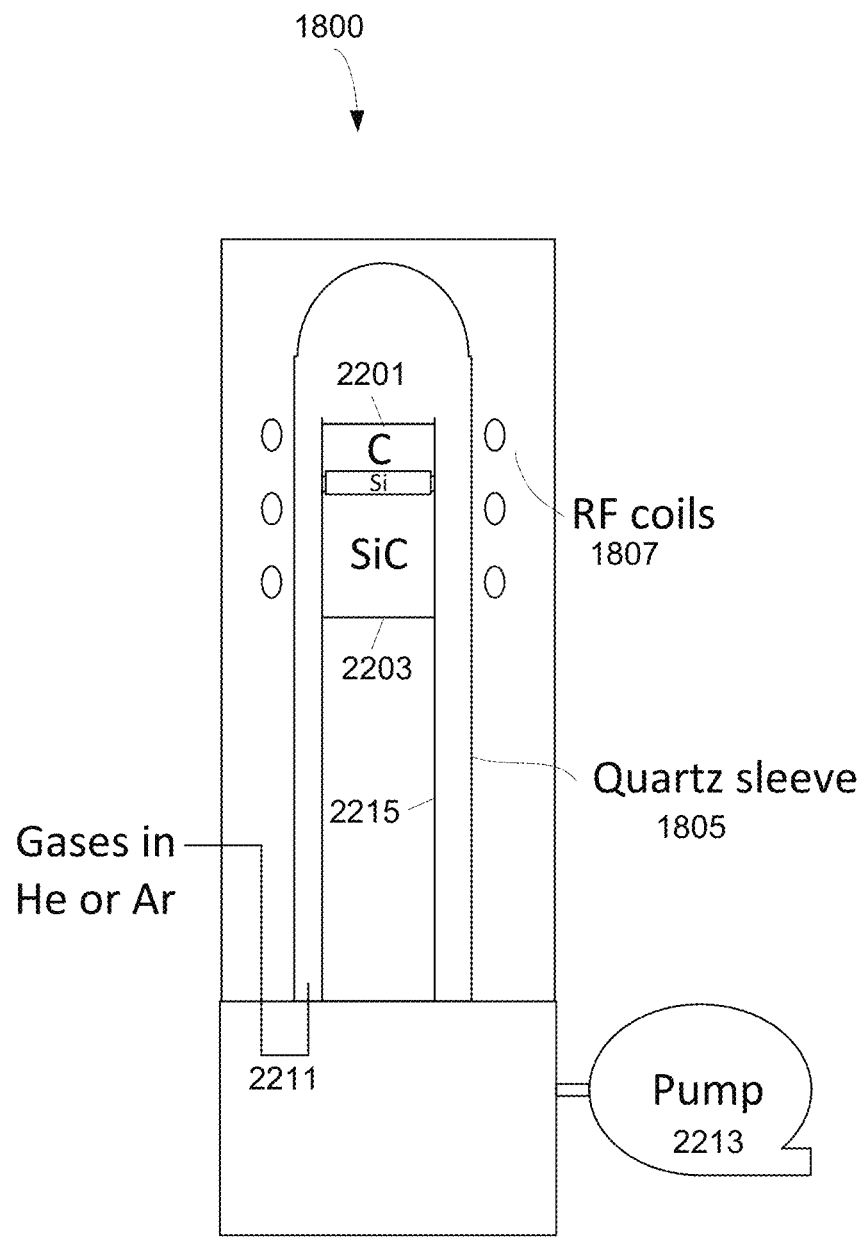
FIG. 22 shows an exemplary configuration of the furnace system for a liquid silicon flow process.

However, the CVI process can take a long time and be costly. In some embodiments, due to the pressure requirement for the CVI process, it may be difficult to seal a desired gas composition, such as He, inside of the composite structure. FIG. 22 shows an exemplary configuration of a furnace system for implementing a liquid silicon flow process that allows the use of a desired gas composition. In this embodiment, a SiC plug 2203 is first coated with resin, which becomes a porous material (e.g., carbon) at a high temperature. Then a thin layer of Si 2205 is placed between the coated SiC plug 2203 and the susceptor block 2201. The Si layer 2205 melts at a high temperature (e.g. 1450° C. or higher) and reacts with porous material (e.g., carbon) to form SiC. In this particular embodiment, the gas inlet and narrow tubular section 2211 are couple to the quartz sleeve 1805 from the bottom side. The RF coils 1807 heats up a portion of the quartz sleeve 1805 to allow localized sealing of the composite structure 2215. A pump 2213 is also connected to the furnace 1800 to control the pressure within the furnace 1800. One advantage of this type of configuration is its short processing time. Also, the Si layer undergoes a liquid to solid transition and expands during this transition, so there is almost no structural void once the SiC plug is sealed. This configuration also allows a desired gas composition, such as He or Ar, to be sealed inside of the composite structure. However, because there could be some unreacted Si in the gap, the mechanical strength of the sealed end may not be as good as the ones manufactured using the CVI configuration shown in FIG. 21.

Figure 23:
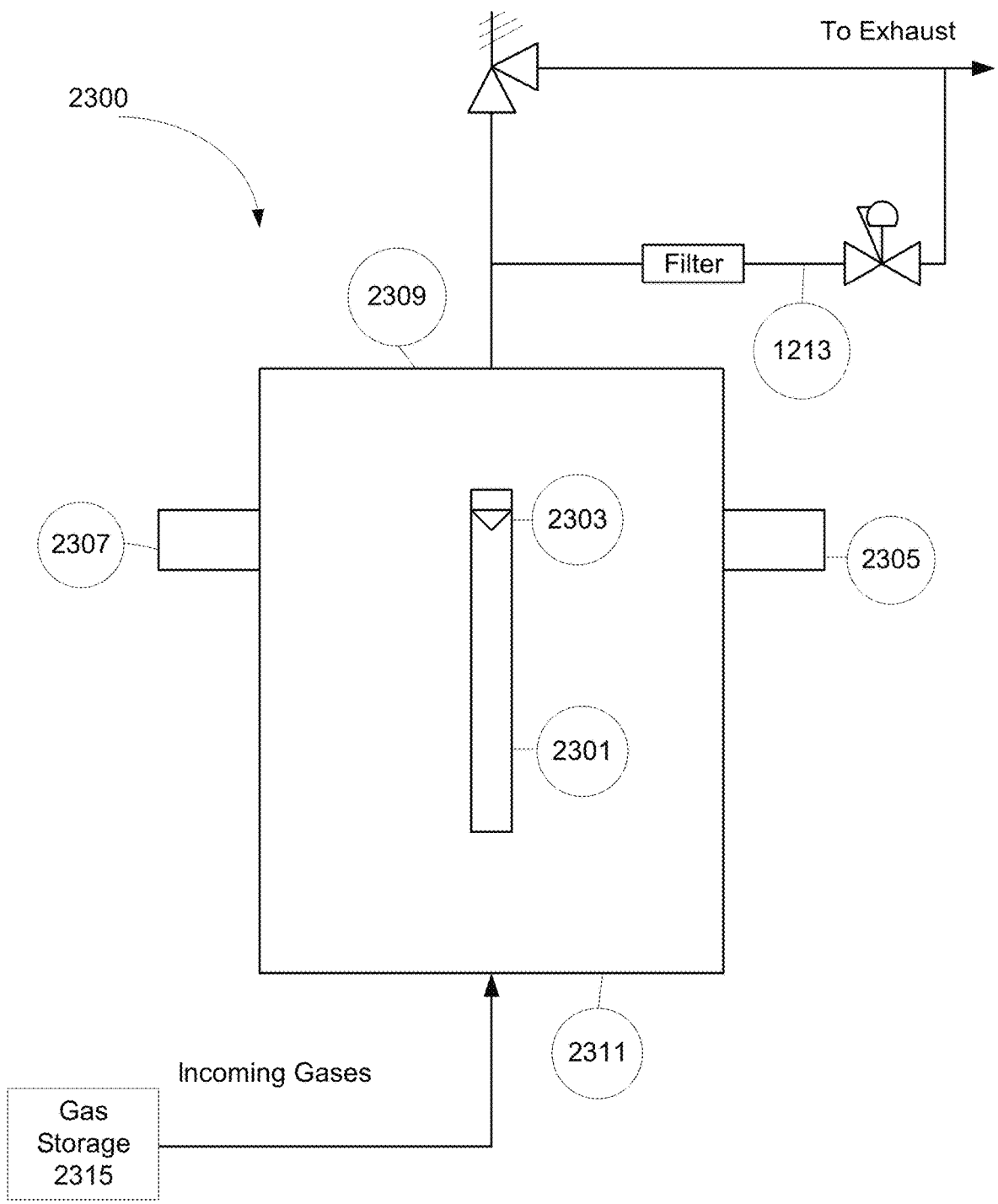
FIG. 23 shows an exemplary schematic diagram of the monitoring mechanism for the furnace system.

During the sealing process, the operating temperatures and pressures of the furnace system can be monitored and controlled with the use of a variety of monitors and regulators. For example, FIG. 23 shows an exemplary schematic diagram of the monitoring mechanism for the furnace system 2300. Several temperature monitors are used in this embodiment. A thermocouple 2301 is used to monitor the temperature of the composite structure. A pyrometer, through a quartz sight glass 2305, provides temperature reading of an area 2303 near the joint area. The area 2303 can be the susceptor block, the area of the composite structure adjacent to the susceptor block, the end plug, or the area of the composite structure adjacent to the end plug. Temperature monitoring can be also conducted at the quartz sight glass 2305, the electrical feedthrough for the coils 2307, and/or the top flange of the furnace 2309 with contact thermocouples. The system also includes a gas storage 2315 that supplies a gas composition to the furnace. To monitor the internal pressure of the furnace, a pressure monitor 2311 can be used. Another pressure monitor 2313 can be used to monitor post-filter gas pressure. Additional monitoring can also be implemented. For example, in some embodiments, various aspects of the RF coils are monitored, including the electric current, frequency, and an adequate coolant flow to prevent overheating.

Figure 24:
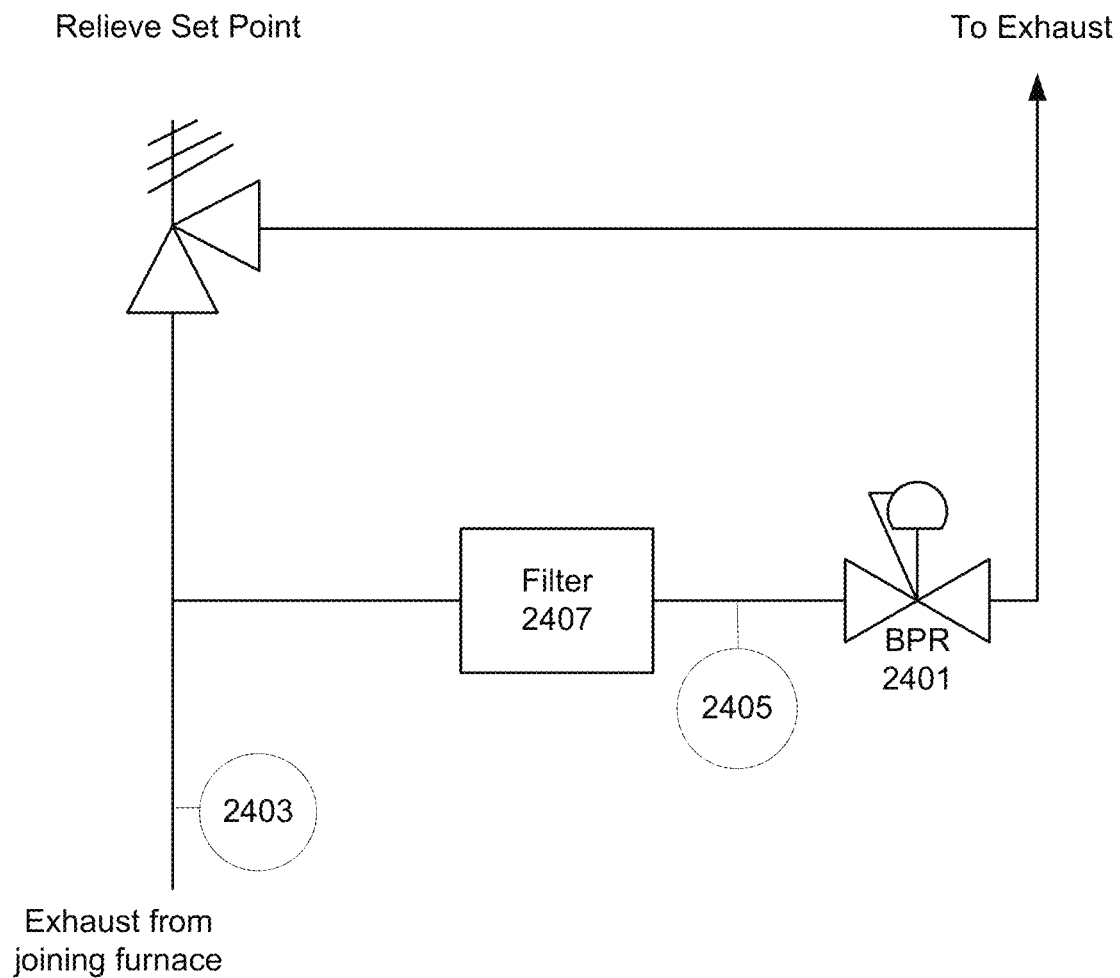
FIG. 24 shows another exemplary schematic diagram of the exhaust monitoring mechanism for the furnace system.

FIG. 24 shows another exemplary schematic diagram of the exhaust monitoring mechanism for a furnace system. The exhaust monitoring mechanism includes a back pressure regulator (BPR) 2401 that can control the pre-filter gas pressure, and two pressure transducers 2403 and 2405. Monitoring both pre-filter gas pressure and post-filter gas pressure using the pressure transducers 2403 and 2405, allows the system to determine, based on pressure drop across the filter 2407, whether there is some level of obstruction at the filter 2407.

Figure 25:
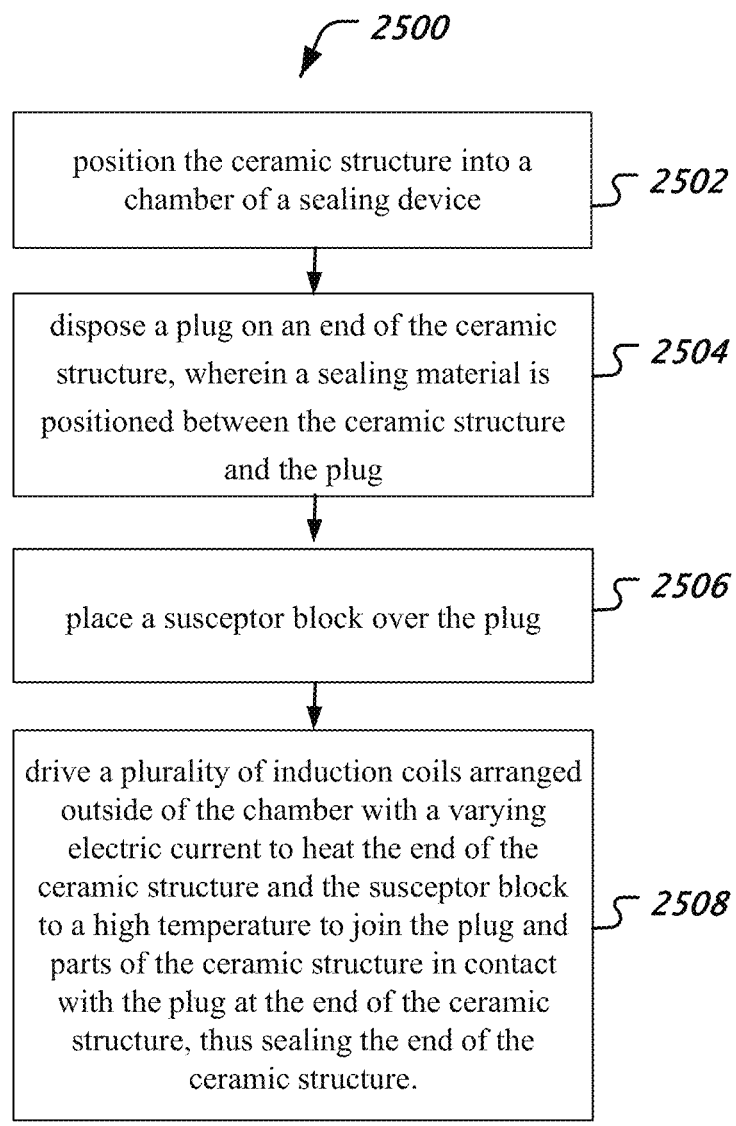
FIG. 25 shows an exemplary flow chart for a method of sealing an end of the SiC cladding.

FIG. 25 shows an exemplary flow chart for a method of sealing ceramic structures used in nuclear reactors. The method includes: at 2502, positioning the ceramic structure into a chamber of a sealing device; at 2504, disposing a plug at an end of the ceramic structure, wherein a sealing material is positioned between the ceramic structure and the plug; at 2506, placing a susceptor block over the plug; and, at 2508, driving a plurality of induction coils arranged outside of the chamber with a varying electric current to heat the end of the ceramic structure and the susceptor block to a high temperature to join the plug and parts of the ceramic structure in contact with the plug at the end of the ceramic structure, thus sealing the end of the ceramic structure.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of joining and sealing a ceramic structure and an end plug, comprising:
   forming a joint of the ceramic structure including a tubular structure and the end plug located inside the tubular structure using a first sealing material;
   applying the first sealing material between the ceramic structure and the end plug, wherein the first sealing material includes a preceramic polymer and a plurality of inclusions;
   locally heating the first sealing material applied between the ceramic structure and the end plug to form a solid ceramic from the first sealing material; and
   crystallizing the solid ceramic to form a crystalline matrix comprising a ceramic polymorph that is the same as the ceramic structure and the end plug, the plurality of inclusions being disposed within the crystalline matrix,
   wherein the end plug is structured to include a hole that goes through a top surface and a bottom surface of the end plug,
   wherein a pin is positioned in the hole; and wherein the method comprises:
   placing a second sealing material in the hole of the end plug;
   applying heat to a section of the ceramic structure near the end plug to heat the second sealing material; and
   applying pressure to the pin so that the pin presses the heated second sealing material in the hole to seal the end plug.

2. The method of claim 1, wherein the plurality of inclusions comprises spheres, flakes, whiskers, fibers, or irregular shapes comprising the ceramic polymorph.

3. The method of claim 1, wherein the first sealing material is cured at a first temperature and pyrolized at a second temperature higher than the first temperature to form the solid ceramic, and the solid ceramic is crystallized at a third temperature higher than the second temperature.

4. The method of claim 1, further comprising heat treating the joined ceramic structure and the end plug at a temperature of at least 1350° C.

5. The method of claim 1, wherein the pin comprises a silicon carbide (SiC) material.

6. The method of claim 1, wherein the pin as a diameter that is substantially similar to a diameter of the hole such that, upon the applying of the pressure to the pin, the heat second sealing material is pressed close to the bottom surface of the end plug to seal the end plug.

7. The method of claim 1, wherein the pin has a diameter that is smaller than a diameter of the hole such that, upon the applying of the pressure to the pin, the heated second sealing material is pressed around to pin to seal the hole.

8. The method of claim 1, wherein the pin comprises a cone-shaped section.

9. The method of claim 8, wherein the pin further comprises a second section having a diameter smaller than a diameter of a diameter of the cone-shaped section.

10. The method of claim 1, wherein the ceramic structure including the tubular structure and the end plug includes a silicon carbide (SiC) material.

11. The method of claim 10, wherein the ceramic polymorph is β-SiC.

12. The method of claim 10, further comprising heat treating the joined ceramic structure and the end plug at a temperature of at least 1350° C.

13. The method of claim 10, further comprising heat treating the joined ceramic structure and the end plug at a temperature of at least 1500° C.

14. The method of claim 1, further includes filling the ceramic structure with a desired gas composition through the hole.

15. The method of claim 14, wherein the pressure is applied to the pin by increasing a pressure of the desired gas composition.

16. The method of claim 1, further comprising heat treating the joined ceramic structure and the end plug at a temperature of at least 1350° C.

17. The method of claim 1, further comprising:
   filling the tubular structure with a desired gas composition through the hole;
   heating a material into a molten form using a heat source; and
   directing the material into the hole, wherein the material solidifies to seal the end plug.

18. The method of claim 17, further comprising:
   strengthening the joint, before the filling of the desired gas composition, by forming a substantially gas impermeable sealing layer on the crystalline matrix, the substantially gas impermeable sealing layer comprising the ceramic polymorph that is same as the ceramic structure and the end plug.

19. The method of claim 18, wherein the strengthening the joint is performed using chemical vapor infiltration (CVI).

20. The method of claim 18, wherein the crystalline matrix further comprises cracks, pores, or voids, and wherein the substantially gas impermeable sealing layer penetrates partially or fully into the crystalline matrix via the cracks, pores, or voids.

21. The method of claim 17, wherein the desired gas composition includes helium gas.

22. The method of claim 17, wherein the material in the molten form solidifies while flowing in the hole.

23. The method of claim 17, wherein the material in the molten form solidifies after the heat source is removed.

24. The method of claim 17, wherein the desired gas composition includes argon (Ar).

* * * * *